(12) United States Patent
Kim et al.

(10) Patent No.: US 7,453,086 B2
(45) Date of Patent: Nov. 18, 2008

(54) THIN FILM TRANSISTOR PANEL

(75) Inventors: Hyun-Wuk Kim, Gyeonggi-do (KR); Jae-Jin Lyu, Gyeonggi-do (KR); Yoon-Sung Um, Gyeonggi-do (KR); Chang-Hun Lee, Gyeonggi-do (KR); Mee-Hye Jung, Gyeonggi-do (KR); Kyoung-Ju Shin, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 486 days.

(21) Appl. No.: 11/332,279

(22) Filed: Jan. 13, 2006

(65) Prior Publication Data
US 2006/0158576 A1    Jul. 20, 2006

(30) Foreign Application Priority Data

Jan. 14, 2005  (KR)  ........................ 10-2005-0003681
Feb. 28, 2005  (KR)  ........................ 10-2005-0016458

(51) Int. Cl.
*H01L 29/10*  (2006.01)
*G02F 1/1343*  (2006.01)

(52) U.S. Cl. .................. 257/59; 257/E27.131; 349/144
(58) Field of Classification Search .................. 257/59, 257/E27.131; 349/144
See application file for complete search history.

(56) References Cited

U.S. PATENT DOCUMENTS

2006/0066797 A1*  3/2006  Baek ........................... 349/139
2006/0092367 A1*  5/2006  Shin et al. .................... 349/144
2006/0138419 A1*  6/2006  Lee et al. ....................... 257/59

FOREIGN PATENT DOCUMENTS

| JP | 2002-40433 | 2/2002 |
| JP | 2003-315800 | 11/2003 |
| JP | 2003-315811 | 11/2003 |
| JP | 2003-322868 | 11/2003 |
| JP | 2003-330028 | 11/2003 |
| JP | 2004-4314 | 1/2004 |

(Continued)

OTHER PUBLICATIONS

Patent Abstracts of Japan, Publication No. 2002-040433, Feb. 6, 2002, 1 p.

(Continued)

*Primary Examiner*—Lex Malsawma
(74) *Attorney, Agent, or Firm*—MacPherson Kwok Chen & Heid LLP

(57) ABSTRACT

A thin film transistor panel is provided. The thin film transistor panel includes: a substrate; gate lines formed on the substrate; data lines insulated from the gate lines and intersecting the gate lines; thin film transistors which are connected to the gate lines and the data lines and have drain electrodes; capacitive coupling electrodes connected to the drain electrodes; and pixel electrodes which are formed in the pixels surrounded by the gate lines and the data lines and include first pixel electrodes connected to the drain electrodes and second pixel electrodes which are separated from the first pixel electrodes and overlap with the capacitive coupling electrodes, wherein the first and second pixel electrodes of different pixel electrodes have a left-right symmetrical structure.

22 Claims, 21 Drawing Sheets

FOREIGN PATENT DOCUMENTS

| | | |
|---|---|---|
| JP | 2004-4315 | 1/2004 |
| JP | 2004-77697 | 3/2004 |
| JP | 2004-77698 | 3/2004 |

OTHER PUBLICATIONS

Patent Abstracts of Japan, Publication No. 2003-3158003, Nov. 6, 2003, 1 p.

Patent Abstracts of Japan, Publication No. 2003-315811, Nov. 6, 2003, 1 p.

Patent Abstracts of Japan, Publication No. 2003-322868, Nov. 14, 2003, 1 p.

Patent Abstracts of Japan, Publication No. 2003-330028, Nov. 19, 2003, 1 p.

Patent Abstracts of Japan, Publication No. 2004-004314, Jan. 8, 2004, 1 p.

Patent Abstracts of Japan, Publication No. 2004-004315, Jan. 8, 2004, 1 p.

Patent Abstracts of Japan, Publication No. 2004-077697, Mar. 11, 2004, 1 p.

Patent Abstracts of Japan, Publication No. 2004-077698, Mar. 11, 2004, 1 p.

* cited by examiner

FIG.8

| A | A | A | A | A | A |
|---|---|---|---|---|---|
| B | B | B | B | B | B |
| A | A | A | A | A | A |
| B | B | B | B | B | B |

FIG.9

| A | A | A | A | A | A |
|---|---|---|---|---|---|
| A | A | A | A | A | A |
| B | B | B | B | B | B |
| B | B | B | B | B | B |

THIN FILM TRANSISTOR PANEL

CROSS REFERENCE TO RELATED APPLICATIONS

This application claims priority from Korean Patent Application No. 10-2005-0003681 filed on Jan. 14, 2005 and Korean Patent Application No. 10-2005-0016458 filed on Feb. 28, 2005, the contents of which are incorporated herein in their entireties.

BACKGROUND OF THE INVENTION (a) Field of the Invention

The present invention relates to a thin film transistor panel, and more particularly, to a thin film transistor panel of a vertically-aligned mode liquid crystal display apparatus capable of providing a wide viewing angle.

(b) Description of the Related Art

A liquid crystal display apparatus, which is one type of flat panel display in current use, includes two panels having electric field generating electrodes such as pixel electrodes and a common electrode and a liquid crystal layer interposed therebetween. The liquid crystal display apparatus displays an image by applying a voltage to electric field generating electrodes to generate an electric field in the liquid crystal layer to determine the alignment of liquid crystal molecules in the liquid crystal layer and control polarization of incident light.

Among such liquid crystal display apparatuses, one type includes a liquid crystal display apparatus using a vertical alignment mode in which liquid crystal molecules are arranged such that major axes of the liquid crystal molecules are perpendicular to the upper and lower panels where no electric field is applied. This provides a high contrast ratio and it can also easily provide a wide reference viewing angle.

As means for implementing the wide viewing angle in the liquid crystal display apparatus with a vertical alignment mode, there are a method of forming cut portion in electric field generating electrodes and a method for forming protrusions on the electric field generating electrodes. Since the cut portions and the protrusions can determine tilted directions of liquid crystal molecules, the tilted directions of the liquid crystal molecules can be distributed into various directions by using the cut portions and the protrusions, so that the wide viewing angle can be achieved.

However, in the liquid crystal display apparatus with a vertical alignment mode, there is a problem in that side visibility deteriorates in comparison to front visibility.

SUMMARY OF THE INVENTION

The present invention provides a thin film transistor panel constructed by dividing each of pixel electrodes into at least two sub-pixel electrodes to apply different two voltages to the sub-pixel electrodes and providing different structures to the at least two sub-pixel electrodes of each pixel.

According to an aspect of the present invention, there is provided a thin film transistor panel comprising: a substrate; gate lines formed on the substrate; data lines insulated from the gate lines and intersecting the gate lines; thin film transistors which are connected to the gate lines and the data lines and have drain electrodes; capacitive coupling electrodes connected to the drain electrodes; and pixel electrodes which are formed in the pixels surrounded by the gate lines and the data lines and include first pixel electrodes connected to the drain electrodes and second pixel electrodes which are separated from the first pixel electrodes and overlap with the capacitive coupling electrodes, wherein the first and second pixel electrodes of different pixel electrodes have a left-right symmetrical structure.

In the aforementioned aspect of the present invention, the first and second pixel electrodes may have the same array structure in a row direction, and the first and second pixel electrodes may have the left-right symmetrical structure alternately in a column direction. In addition, the first and second pixel electrodes may have the same array structure in a row direction, and the first and second pixel electrodes may have the left-right symmetrical structure alternately in units of two columns in a column direction.

In addition, the pixels where the first and second pixel electrodes of different pixel electrodes have a left-right symmetrical structure may be arrayed in the same area or number.

In addition, the pixel electrode may have cut portions as domain division means. In addition, the cut portions may be connected to each other to form gaps which separate the first pixel electrodes and the second pixel electrodes. In addition, the gaps may have slanted portions having a slanted angle of 45° with respect to the first signal lines.

According to another aspect of the present invention, there is provided a thin film transistor panel comprising: a substrate; gate lines formed on the substrate; data lines insulated from the gate lines and intersecting the gate lines; thin film transistors which are connected to the gate lines and the data lines and have drain electrodes; capacitive coupling electrodes connected to the drain electrodes; and pixel electrodes which are formed in the pixels surrounded by the gate lines and the data lines and include first pixel electrodes connected to the drain electrodes and second pixel electrodes which are separated from the first pixel electrodes and overlap with the capacitive coupling electrodes, wherein the first pixel electrodes of different pixel electrodes are adjacent to each other, and the second pixel electrodes of the different pixel electrodes are adjacent to each other.

In the aforementioned aspect of the present invention, positions of the first pixel electrodes connected to the drain electrodes in the different pixels may be different from each other.

In addition, the first pixel electrode of one of the pixels may be adjacent to the second pixel electrode of different pixels which are adjacent to each other in an up down direction.

In addition, the pixel electrode may have cut portions as domain division means.

In addition, the cut portions may be connected to each other to form gaps which separate the first pixel electrodes and the second pixel electrodes In addition, the gaps may have slanted portions having a slanted angle of 45° with respect to the first signal lines.

According to still another aspect of the present invention, there is provided a thin film transistor panel: comprising: gate lines transmitting scan signals; data lines interesting the gate lines and transmitting image signals; thin film transistors connected to the gate lines and the data line and having drain electrodes; and pixel electrodes connected to the thin film transistors through the drain electrodes and formed in pixels surrounded by the gate lines and the data lines, wherein the pixel electrodes include first and second sub-pixel electrodes, wherein the gate lines include first and second gate lines disposed to correspond to the first and second sub-pixel electrodes, wherein the thin film transistors include first and second thin film transistors connecting the first and second sub-pixel electrode, the first and second gate lines, and the data lines, wherein the drain electrodes include the first and second drain electrodes, and wherein the first sub-pixel electrodes of different pixels are adjacent to each other, and the second sub-pixel electrodes of the different pixels are adjacent to each other.

In the aforementioned aspect of the present invention, the first sub-pixel electrodes of the different pixels may have different positions.

In addition, the first sub-pixel electrode of one pixel may be adjacent to the second sub-pixel electrode of different pixels adjacent to the one pixel in an up down direction.

In addition, the thin film transistor panel may further comprise storage electrode lines inducing first and second storage electrodes which overlap with the first and second sub-pixel electrodes, respectively.

In addition, the first and second sub-pixel electrodes may have a substantially symmetrical shape with respect to a straight line parallel to the gate line.

In addition, at least one of the first and second sub-pixel electrodes may have cut portions.

In addition, the common electrode may have cut portions.

In addition, at least one of the first and second pixel electrodes and the common electrode may have cut portions which are alternately arrayed.

In addition, the thin film transistor panel may further comprise shielding electrodes which overlap with the data lines and are disposed on the same layer as the first and second sub-pixel electrodes are disposed on.

BRIEF DESCRIPTION OF THE DRAWINGS

The above and other features and advantages of the present invention will become more apparent in light of the exemplary embodiments described below with reference to the attached drawings in which:

FIG. 8 is a view showing a layout of a pixel array structure in a liquid crystal display apparatus according to an embodiment of the present invention;

FIG. 9 is a view showing a layout of a pixel array structure in a liquid crystal display apparatus according to another embodiment of the present invention;

DETAILED DESCRIPTION OF THE PREFERRED EMBODIMENTS

Figure 1:
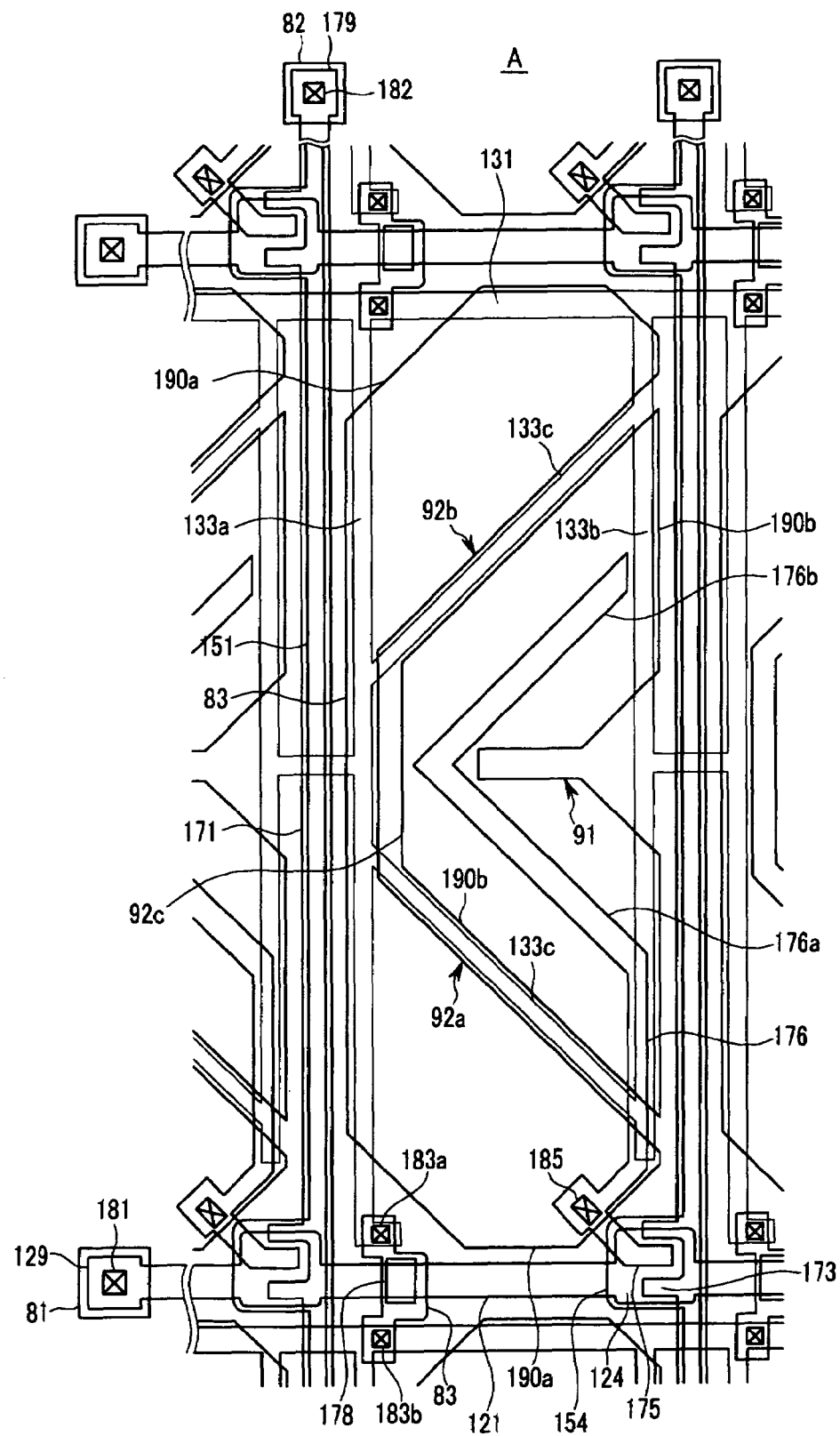
FIG. 1 is a view showing a layout of a structure of a pixel in a thin film transistor panel for a liquid crystal display apparatus according to an embodiment of the present invention.

Hereinafter, exemplary embodiments of the present invention are described below in detail with reference to the attached drawings such that the present invention can be easily put into practice by those skilled in the art. The present invention can be embodied in various forms, but it limited thereto.

In the drawings, thicknesses are enlarged for the purpose of clearly illustrating layers and areas. In addition, like elements are denoted by like reference numerals in the whole specification. If it is mentioned that a layer, a film, an area, or a plate is placed on a different element, it includes a case that the layer, film, area, or plate is placed right on the different element, as well as a case that another element is disposed therebetween. On the contrary, if it is mentioned that one element is placed right on another element, it means that no element is disposed therebetween.

Now, a thin film transistor panel according to the present invention will be described with reference to accompanying drawings.

Figure 2:
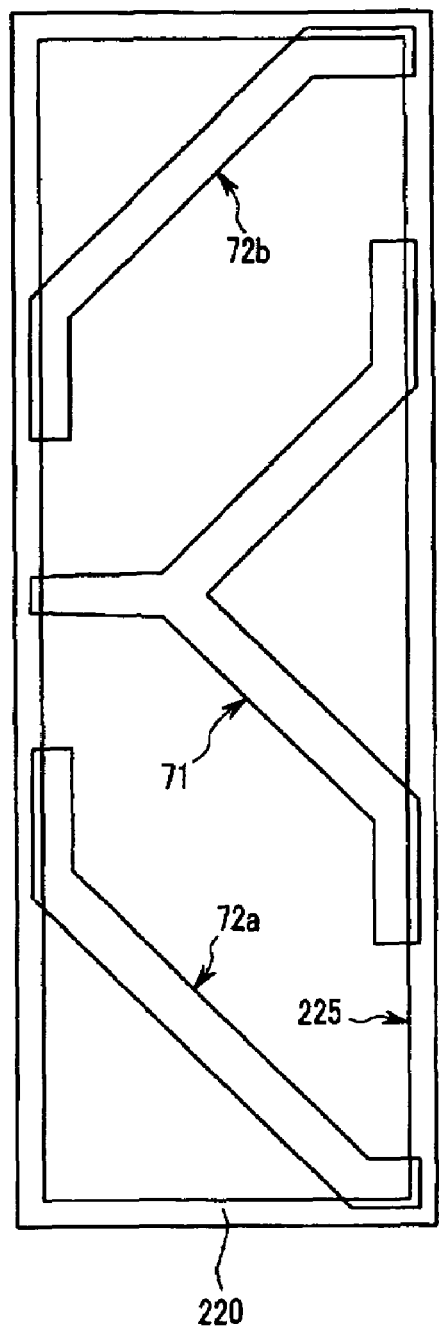
FIG. 2 is a view showing a layout of a structure of a pixel in a common electrode panel for a liquid crystal display apparatus according to an embodiment of the present invention.
Figure 3:
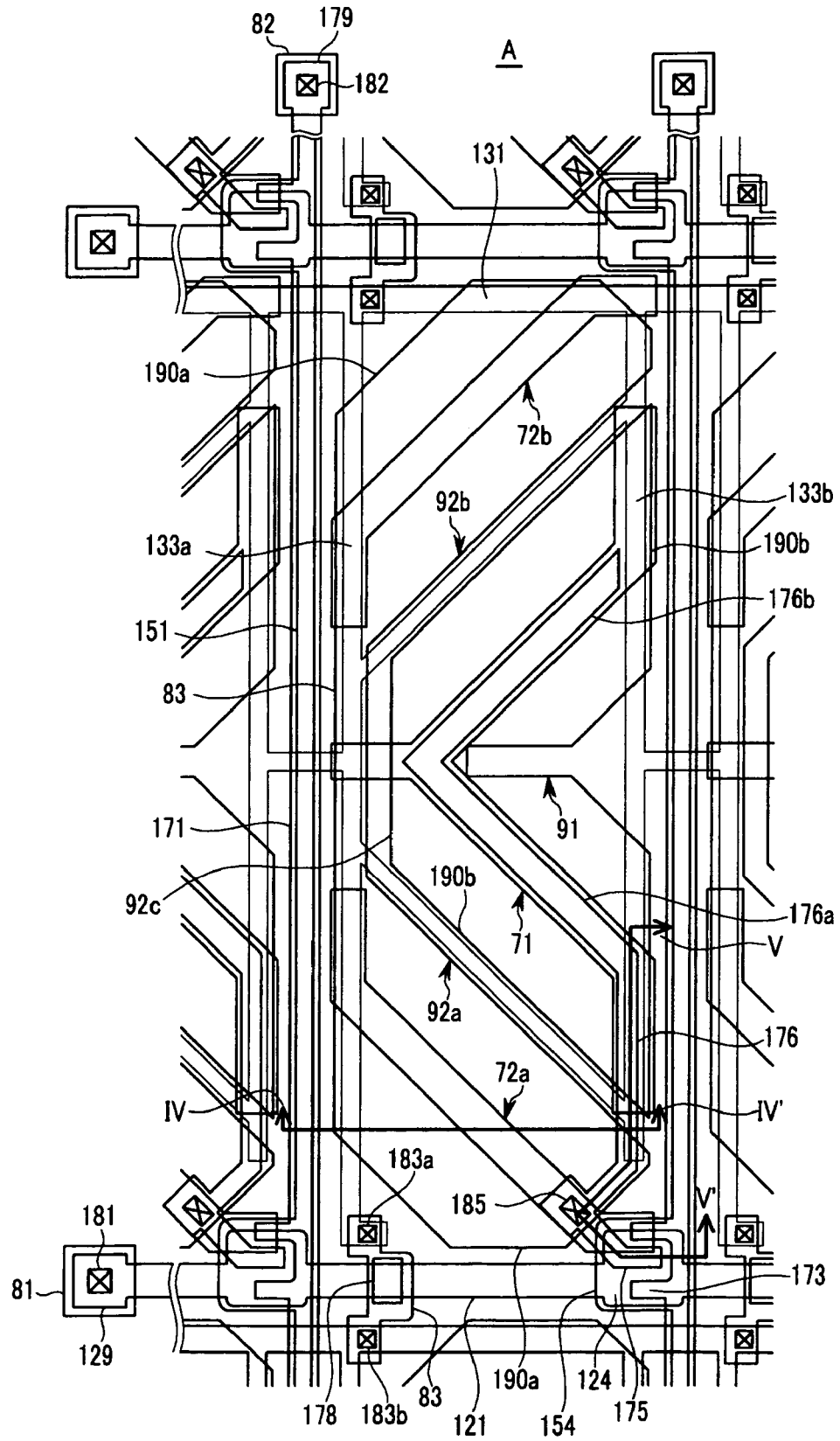
FIG. 3 is a view showing a layout of a structure of a pixel A of a liquid crystal display apparatus using the two panels of the type illustrated in FIGS. 1 and 2 according to an embodiment of the present invention.
Figure 4:
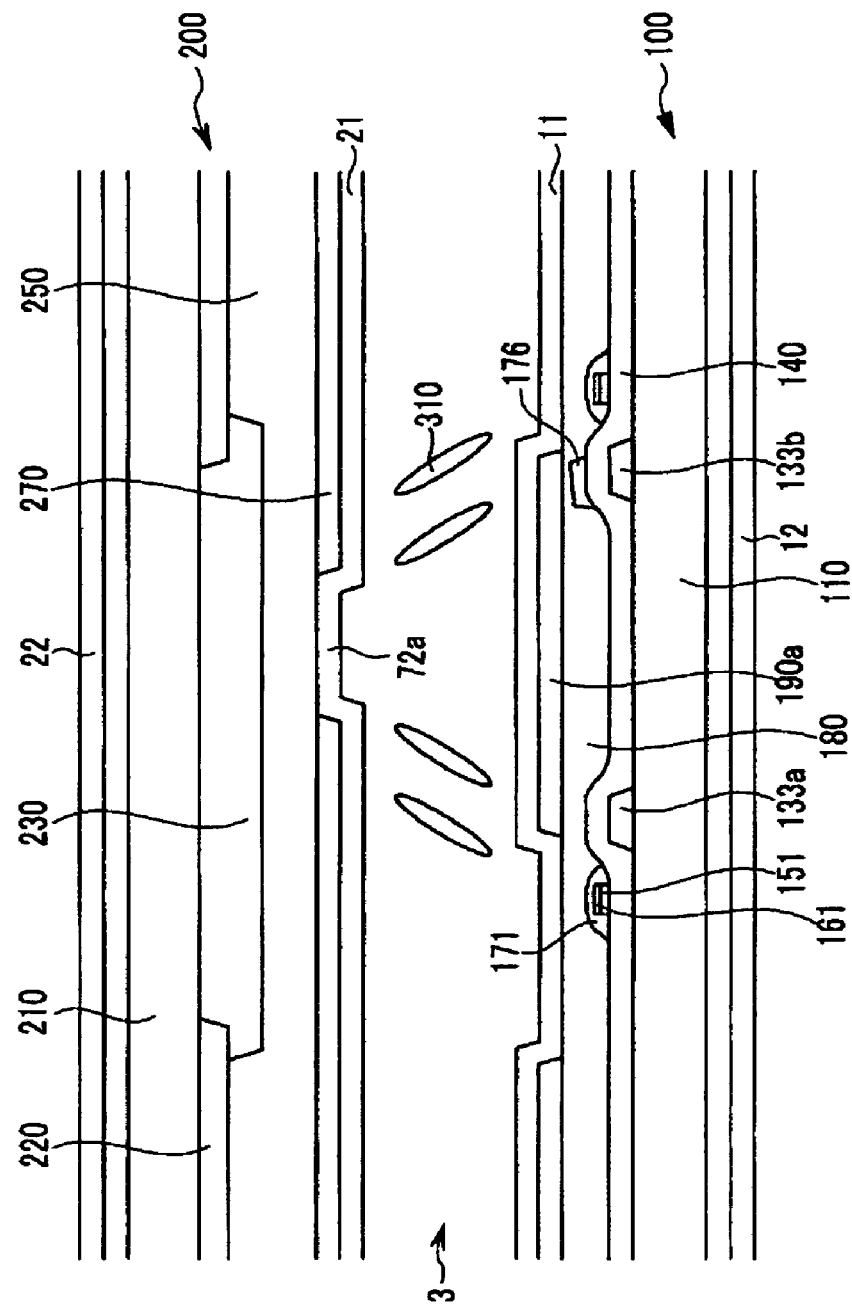
FIGS. 4 and 5 are cross sectional views showing the liquid crystal display apparatus taken along lines IV-IV' and V-V' of FIG. 3, respectively.
Figure 5:
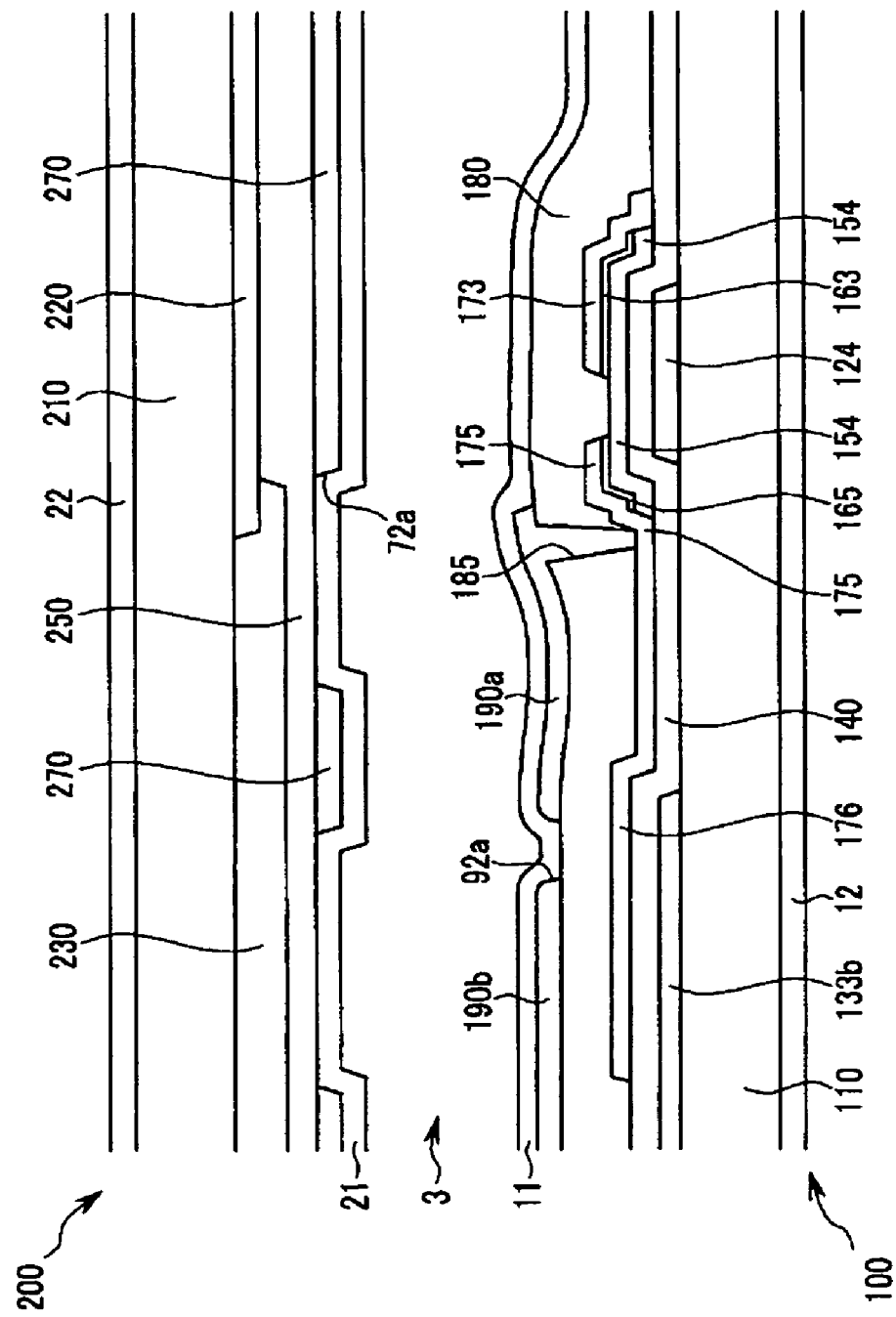
Figure 6:
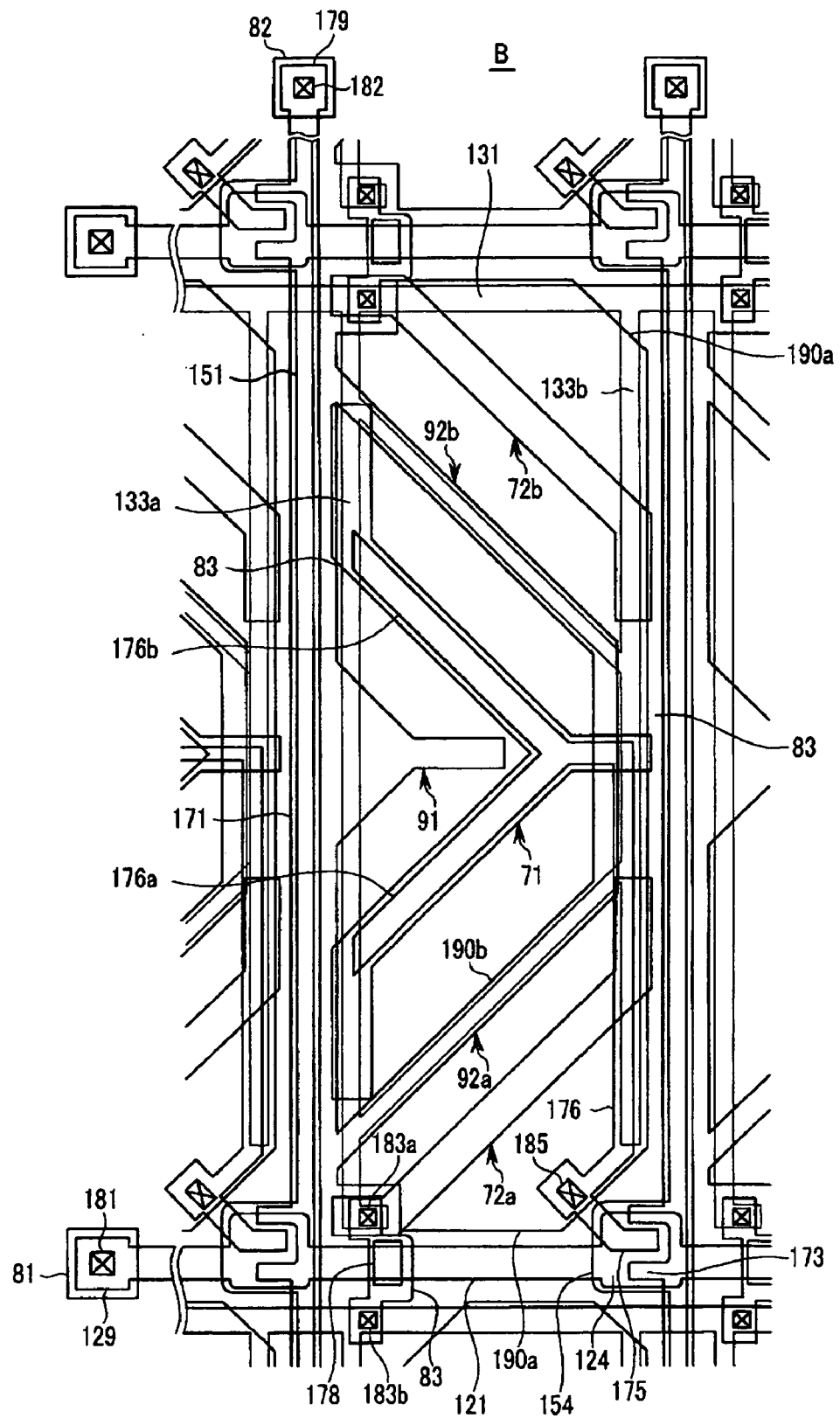
FIG. 6 is a view showing a layout of a structure of a pixel B of a liquid crystal display apparatus shown in FIGS. 1 to 5.
Figure 7:
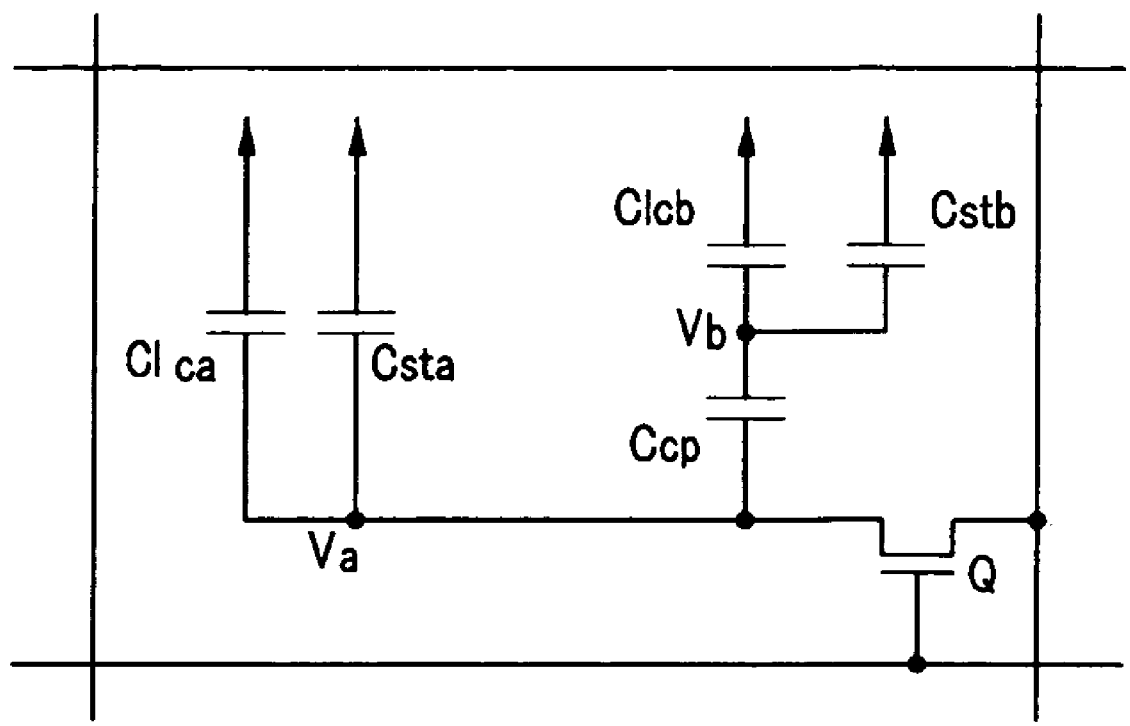
FIG. 7 is a circuit diagram showing a structure of a pixel of a liquid crystal display apparatus according to an embodiment of the present invention.

FIG. 1 is a view showing a layout of a structure of a pixel indicated by the letter A in a thin film transistor panel for a liquid crystal display apparatus according to an embodiment of the present invention; FIG. 2 is a view showing a layout of a structure of a pixel in a common electrode panel for a liquid crystal display apparatus according to an embodiment of the present invention and FIG. 3 is a view showing a layout of a structure of a pixel A of a liquid crystal display apparatus using panels of the type shown in FIGS. 1 and 2 according to an embodiment of the present invention. FIGS. 4 and 5 are cross sectional views showing the liquid crystal display apparatus taken along lines IV-IV' and V-V' of FIG. 3, respectively. FIG. 6 is a view showing a layout of a structure of a pixel B of a liquid crystal display apparatus shown in FIGS. 1 to 5; and FIG. 7 is a circuit diagram showing a structure of a pixel of liquid crystal display apparatus according to an embodiment of the present invention.

A liquid crystal display apparatus according to one embodiment includes a thin film transistor panel 100, a common electrode panel 200, and a liquid crystal layer 3 interposed between the two panels 100 and 200.

Firstly, the thin film transistor panel 100 will be described in detail with reference to FIGS. 1, and 3 to 6.

A plurality of gate lines 121 and a plurality of storage electrode lines 131 are disposed on a dielectric substrate 110.

The gate lines 121 mainly extend in a longitudinal direction to be separated from each other and transmit gate signals. Each of the gate lines 121 includes a plurality of protrusions constituting a plurality of gate electrodes 124 and an end portion 129 having a wide area for connection to other layers or external apparatuses.

The storage electrode lines 131 mainly extend in a longitudinal direction to be adjacent to the data lines 121 and include a plurality of branch groups constituting first to fourth storage electrodes 133a, 133b, 133c, and 133d. The first and second storage electrodes 133a and 133b extend in a transverse direction. The third and fourth storage electrodes 133c and 133d extend in a slanted direction to be connected to ends of the second storage electrode 133b and to an end of first storage electrode 133a so as to be adjacent to each other. The third and fourth storage electrodes 133c and 133d have inversion symmetry with respect to a central line between the two adjacent gate lines 121. A predetermined voltage such as a common voltage applied to the common electrode 270 of the common electrode panel 200 of the liquid crystal display apparatus is applied to each of the storage electrode lines 131. The storage electrode lines 131 includes connection portions 133e connecting a group of the first to fourth storage electrodes 133a, 133b, 133c, and 133d. As shown in FIGS. 3 and 6, the third and fourth storage electrodes 133c and 133d of pixels A and B have inversion symmetry with respect to the data line 171.

The gate lines 121 and the storage electrode lines 131 may be made of an aluminum based metal, a silver based metal, a copper based metal, a molybdenum based metal, chromium (Cr), titanium (Ti), or tantalum (Ta). The gate lines 121 and the storage electrode lines 131 may have a multi-layered structure including two layers (not shown) having different physical properties. One of the two conductive layers is made of a metal having a low resistivity, for example, an aluminum based metal such as aluminum (Al) and an aluminum alloy, a silver based metal such as silver (Ag) and a silver alloy, a copper based metal such as copper (Cu) and copper alloy, in order to reduce signal delay or voltage drop of the gate lines and the storage electrode lines. The other conductive layer is made of a material having a good contactness to other materials, particularly, ITO (indium tin oxide) and IZO (indium zinc oxide), for example, chromium (Cr), molybdenum (Mo), a molybdenum alloy, tantalum (Ta), or titanium (Ti). As a suitable example of two conductive layers, there are a chromium/aluminum-neodymium (Nd) alloy and a molybdenum or molybdenum alloy/aluminum alloy.

In addition, side surfaces of the gate lines 121 and the storage electrode lines 131 are slanted with respect to a surface of the substrate 110, and it is preferable that the slanted angle is in a range of 30° to 80°.

A gate insulating layer 140 made of a silicon nitride $SiN_x$ or the like is formed on the gate lines 121 and the storage electrode lines 131.

A plurality of line-shaped semiconductors 151 made of a hydrogenated amorphous silicon (abbreviated to a-Si) are formed above the gate insulating film 140. The line-shaped semiconductors 151 mainly extend in the transverse direction, and a plurality of protrusions 154 extend toward the gate electrodes 124. The protrusions 154 are enlarged up to upper portions of the gate lines 121 and the storage electrode lines 131. It is preferable that the line-shaped semiconductors 151 are enlarged with a large width at lower portions of the data lines 171 where the connection portions 133e of the storage electrode lines 131 pass so as to entirely cover a portion of the storage electrode lines 131.

A plurality of line-shaped and island-shaped ohmic contact members 161 and 165 made of a silicide or an n+ hydrogenated amorphous silicon or the like which are doped with n type impurities such as phosphorus (P) are formed above the semiconductors 151. The line-shaped ohmic contact members 161 have a plurality of protrusions 163. The protrusions 163 and the island-shaped ohmic contact members 165 constitute pairs and are disposed on the semiconductors 154 to face each other with the gate electrodes 124 interposed therebetween.

Side surfaces of the semiconductors 151 and the ohmic contact members 161 and 165 are also slanted with respect to the surface of the substrate 110, and the slanted angle is in a range of 30° to 80°.

A plurality of data lines 171 and a plurality of drain electrodes 175 which are separated from a plurality of the data lines 171 are formed on the ohmic contact members 161 and 165 and the gate insulating film 140.

The data lines 171 mainly extend in the transverse direction to intersect the gate lines 121 and the storage electrode lines 131 and apply the data voltages thereto. The data lines 171 have end portions 179 which have enlarged widths for connection to other layers or external apparatuses.

Each of the drain electrodes 175 includes an enlarged portion having a large width. Each of the data lines 171 includes a plurality of protrusions, and the protrusions are curved so as to partially surround ends of the drain electrodes 175 disposed on the semiconductors 154, thereby constituting source electrodes 173. One of the gate electrodes 124, one of the source electrodes 173, and one of the drain electrodes 175 together with one of the semiconductors 154 constitute one of the thin film transistors (TFTs). Channels of the thin film transistors are formed in the protrusions 154 between the source electrodes 173 and the drain electrodes 175.

In addition, the drain electrodes 175 include capacitive coupling electrodes 176 which overlap with the second storage electrodes 133b to extend in the transverse direction. The capacitive coupling electrodes 176 are connected to each other and include third and fourth storage electrodes 133c an 133d and two slanted portions 176a and 176b which are parallel to each other. Similar to the third and fourth storage electrodes 133c and 133d, the two slanted portions 176a and 176b has inversion symmetry with respect to the data lines 171 in the pixels A and B.

A plurality of under-bridge metal pieces 178 disposed on the gate lines 121 are formed in the same layer as a layer of the data lines 171. The under-bridge metal pieces 178 are disposed to overlap with the gate lines 121.

The data lines 171 and the drain electrodes 175 are made of, preferably, chromium, a molybdenum based metal, or a refractory metal such as tantalum and titanium and may have a multi-layered structure which is constructed with a lower layer (not shown) made of the refractory metal and an upper layer (not shown) made of a low resistance material disposed thereon.

Similar to the gate lines 121 and the storage electrode line 131, the side surfaces of the data lines 171 and the drain electrodes 175 are slanted in an angle ranging from 30° to 80°.

The ohmic contact members 161 and 165 are interposed only between the underlying semiconductors 151 and the overlying data lines 171 and drain electrodes 175 and have a function of reducing contact resistance. The semiconductors 151 have exposed portions uncovered between the source electrodes 173 and drain electrodes 175 as well as between the data lines 171 and the drain electrodes 175.

A protective film (passivation layer) 180 is formed on the data lines 171, the drain electrodes 175, and the exposed semiconductors 151 uncovered by them. The protective film 180 is made of an organic material having an excellent planarization property and photosensitivity, and a low dielectric-constant insulating material having a dielectric constant of 4.0 or less formed with a plasma enhanced chemical vapor deposition (PECVD) such as a-Si:C:O and a-Si:O:F, or an inorganic material such as a silicon nitride and a silicon oxide. The protective film 180 may have a two-layered structure of a lower inorganic film and an upper organic film.

In the protective film 180, a plurality of contact holes 182 and 185 which expose the enlarged portions of the drain electrodes 175 and the end portions 179 of the data lines 171 are formed, and a plurality of contact holes 181, 183*a*, and 183*b* which expose the end portions 129 of the gate lines 121 together with the gate insulating film 140 are formed. The contact hole 181, 182, 183*a*, 183*b*, and 185 may be formed in various shapes such as polygon and circle. Side walls of the contact hole 181, 182, 183*a*, 183*b*, and 185 may be slanted with an angle of 30° to 85° or have a shape of step.

A plurality of first sub-pixel electrodes 190*a* and second sub-pixel electrode 190*b*, storage electrode line connection bridges 83, and a plurality of contact assistant members 81 and 82 are formed on the protective layer 180 made of ITO or IZO. Unlike this, the first sub-pixel electrodes 190*a* and second sub-pixel electrode 190*b* may be made of a transparent conductive polymer, and in case of a reflective liquid crystal display apparatus, the first and second sub-pixel electrodes 190*a* and 190*b* may be made of a non-transparent reflective metal. In this case, the contact assistant members 81 and 82 may be made of a material different from the pixel electrodes 190, for example, ITO or IZO.

The storage electrode line connection bridges 83 are formed across the gate lines 121 and the source electrode 173 and connected through the contact holes 183*a* and 183*b* to the exposed ends of the first storage electrodes 133*a* and the exposed ends of the storage electrode lines 131 which are opposite to each other with the gate lines 121 interposed. The storage electrodes 133*a* and 133*b* and the storage electrode lines 131 can be used to repair defects of the storage electrode line connection bridges 83, the metal pieces 178, the gate lines 121, the data lines 171, or the thin film transistors. In repairing of the gate line 121, the intersections between the gate line 121 and the storage electrode line connection bridge 83 are illuminated with a laser to electrically connect the gate line 121 and the storage electrode line connection bridge 83, so that the gate line 121 and the storage electrode line 131 can be electrically connected. At this time, the metal pieces 178 have a function of reinforcing electrical connection between the gate line 121 and the storage line connection bridge 83.

The first sub-pixel electrodes 190*a* are physically and electrically connected through the contact holes 185 to the drain electrodes 175 to receive data voltages from the drain electrodes 175. The first sub-pixel electrodes 190*a* and second sub-pixel electrode 190*b* are applied with the data voltages together with the common electrode 270 generate electric fields, so that the liquid crystal molecules of the liquid crystal layer are aligned.

The first sub-pixel electrode 190*a* and second sub-pixel electrodes 190*b* and the common electrode 270 constitute capacitors (hereinafter, referred to as a "liquid crystal capacitor") to sustain the applied voltages although the thin film transistors turn off. In order to increase voltage sustaining capability, other capacitors, called storage capacitors, connected in parallel to the liquid crystal capacitors are provided. The storage capacitors are constructed by overlapping the first sub-pixel electrodes 190*a* and second sub-pixel electrode 190*b* with the storage electrode lines 131. In order to increase electrostatic capacitance, that is, storage capacitance of the storage capacitors, storage electrodes 133*a*, 133*b*, 133*c*, and 133*d* are provided to the storage electrode lines 131, and the drain electrodes 175 connected to the first sub-pixel electrodes 190*a* and second sub-pixel electrode 190*b* extend and enlarge to overlap. As a result, a distance between ports is shortened, and the overlap area increases.

The first sub-pixel electrodes 190*a* and the second sub-pixel electrode 190*b* are separated from each other. As will be appreciated by reference to FIG. 1, the first sub-pixel electrodes 190*a* have two portions, one disposed above and the other under the second sub-pixel electrode 190*b*. The two portions of the first sub-pixel electrode are connected to each other. Therefore, the second sub-pixel electrode 190*b* is interposed between the two portions of the first sub-pixel electrode 190*a*. Referring to FIG. 1, it will be appreciated that the second sub-pixel electrode 190*b* has a truncated triangular shape and the shorter side 92*c* faces to the left. In contrast, in pixel B the shorter side of the truncated triangular shaped second sub-pixel electrode 190*b* faces to the right as will be appreciated by reference to FIG. 6. The two portions of the first sub-pixel electrode 190*a* and the second sub-pixel electrode 190*b* have sides which face each other and are slanted with an angle of ±45° with respect to the gate line 121, thereby having a symmetrical structure with respect to a central line between the adjacent two gate lines 121.

Here, the first sub-pixel electrodes 190*a* are connected through the contact holes 185 to the drain electrode 175, so that the first pixel electrodes are directly supplied with the data voltages from the drain electrodes. In contrast, the second sub-pixel electrode 190*b* overlap with the capacitive coupling electrodes 176 which are connected to the first sub-pixel electrodes 190*a*. Therefore, the second sub-pixel electrodes 190*b* are electromagnetically coupled (capacitively coupled) with the first sub-pixel electrodes 190*a*.

The left corner of each first sub-pixel electrode 190*a* of the pixel A is cut, and the right corner of each first sub-pixel electrode 190*a* of the pixel B is cut. The cut sides have an angle with of about ±45° with respect to the gate line 121.

Each of the first sub-pixel electrodes 190*a* and second sub-pixel electrode 190*b* has a central cut portion 91, a lower cut portion 92*a*, and an upper cut portion 92*b*, and each of the first sub-pixel electrodes 190*a* and second sub-pixel electrode 190*b* is divided into a plurality of domains by the cut portions 91, 92*a*, and 92*b*. The cut portions 91, 92*a*, and 92*b* have substantially inversion symmetry with respect to a central longitudinal line which bisects the first sub-pixel electrodes 190*a* and second sub-pixel electrode 190*b* in a direction parallel to the gate line 121. Here, the lower and upper cut portions 92*a* and 92*b* are connected to each other to constitute a gap for dividing the first sub-pixel electrode 190*a* and the second sub-pixel electrode 190*b*.

The lower and upper cut portions 92*a* and 92*b* extend substantially from the right sides of the first sub-pixel electrodes 190a and second sub-pixel electrode 190b to the left sides thereof in a slanted direction in the pixel A, extend substantially from the left sides to the right sides in a slanted direction in the pixel B, and are located in the lower and upper half regions with respect to the central transverse lines of the first sub-pixel electrodes 190a and second sub-pixel electrode 190b. The lower and upper cut portions 92a and 92b extend in perpendicular to each other, and at an angle of about ±45° with respect to the gate line 121.

One central cut portion 91 is disposed at the center of the second pixel electrode 190b and has an inlet at the right or left side in the pixel A or B. The inlet of the central cut portion 91 has a pair of slanted sides which are substantially parallel to the lower and upper cut portions 92a and 92b, respectively.

Accordingly, each of the lower half regions of the first sub-pixel electrodes 190a and second sub-pixel electrode 190b is divided into two domains by the lower cut portion 92a, and each of the upper half regions thereof is also divided into two domains by the upper cut portion 92b. In the pixels A and B, the first sub-pixel electrodes 190a and second sub-pixel electrode 190b have inversion symmetry structure. Here, the number of domains or the number of cut portions may vary according to a size of pixel, an aspect ratio of the pixel electrodes, a type or characteristics of the liquid crystal layer 3, or other design factors and may vary according to the slanted directions.

The first sub-pixel electrodes 190a and second sub-pixel electrode 190b overlap with the adjacent gate lines 121 or the data lines 171, so that an aperture ratio thereof increases.

The contact assistant members 81 and 82 are connected through the contact holes 181 and 182 to the end portions 129 of the gate lines 121 and the end portions 179 of the data lines 171, respectively. The contact assistant members 81 and 82 have a function of compensating for adhesiveness of the exposed end portions 129 of the gate lines 121 and the exposed end portions 179 of the data lines 171 to external apparatuses and protecting these portions. The contact assistant members 81 and 82 are connected to external apparatuses through an anisotropic conducive layer (not shown).

In a case where the gate driving circuit is integrated in the thin film transistor panel 100, the contact assistant member 81 has a function of connecting metal layers of the gate driving circuit and the gate lines 121. Similarly, in a case where the data driving circuit is integrated in the thin film transistor panel 100, the contact assistant member 82 has a function of connecting metal layers of the data driving circuit and the data lines 171.

Now, the common electrode panel 200 will be described with reference to FIGS. 2 to 6.

A light shielding member 220 is formed on a dielectric substrate 210 made of a transparent glass or the like. The light-shielding member 220 has a plurality of openings which face the first sub-pixel electrodes 190a and second sub-pixel electrode 190b and have substantially the same shape as the first sub-pixel 190a and second sub-pixel electrode 190b. Alternatively, the light-shielding member 220 may be constructed with portions corresponding to the data lines 171 and portions corresponding to the thin film transistors.

A plurality of color filters 230 are formed on the substrate 210 and disposed in most regions surrounded by the light-shielding member 220. The color filters 230 may be elongated along the first sub-pixel electrodes 190a and second sub-pixel electrode 190b in the transverse direction. The color filters 230 can display one of primary colors such as red, green, and blue.

A cover film 250 is formed on the color filters 230.

A common electrode 270 made of a transparent conductive material such as ITO and IZO is formed on the cover film 250.

The common electrode 270 includes a plurality of pairs of cut portions 71, 72a, and 72b.

A pair of the cut portions 71, 72a, and 72b faces one of the first sub-pixel electrodes 190a and second sub-pixel electrode 190b and includes central cut portions 71 and upper and lower cut portions 72a and 72b. The cut portions 71, 72a, and 72b are disposed between the cut portions 91, 92a, and 92b of the adjacent first sub-pixel electrodes 190a and second sub-pixel electrode 190b or between the edge cut portions 92a and 92b and the slanted sides of the first sub-pixel electrodes 190a and second sub-pixel electrode 190b. In addition, each of the cut portions 71, 72a, and 72b has at least one slanted portion which extends in parallel to the cut portions 91, 92a, and 92b.

Each of the lower and upper cut portions 72a and 72b has slanted portions which extend substantially from the right sides of the first sub-pixel electrodes 190a and second sub-pixel electrode 190b to the lower or upper side thereof in the pixel A and extend substantially from the left sides of the first sub-pixel electrodes 190a and second sub-pixel electrode 190b to the lower or upper side thereof in the pixel B. In addition, each of the lower and upper cut portions 72a and 72b includes longitudinal and transverse portions which extend from ends of the slanted portions along the sides of the first sub-pixel electrodes 190a and second sub-pixel electrode 190b with an obtuse angle with respect to the slanted portion and overlap with the sides of the first sub-pixel electrodes 190a and second sub-pixel electrode 190b.

The central cut portion 71 includes a central longitudinal portion which extends substantially from the left side of the first sub-pixel electrode 190a and second sub-pixel electrode 190b in the longitudinal direction in the pixel A and extends from the right side in the longitudinal direction in the pixel B, a pair of slanted portions which extend from the ends of the central longitudinal portion to the left and right sides of the first sub-pixel electrodes 190a and second sub-pixel electrode 190b with an slanted angle with respect to the central longitudinal portion, and a distal transverse portion which extend from the ends of the slanted portions along the left and right sides of the first sub-pixel electrodes 190a and second sub-pixel electrode 190b with an obtuse angle with respect to the slanted portions and overlap with the left and right sides of the first sub-pixel electrodes 190a and second sub-pixel electrode 190b. Therefore, the cut portions 71, 72a, and 72b of the common electrode 270 have a mirror-like symmetrical structure in the pixels A and B.

The number of the cut portions 71, 72a, and 72b may vary according to the design factors, and the light-shielding member 220 overlaps with the cut portions 71, 72a, and 72b to shield the light leakage in a vicinity of the cut portions 71, 72a, and 72b. In the embodiment, the slanted portions 176a and 176b of the capacitive coupling electrode 176 overlap with the cut portions 71, 72a, and 72b to shield the light leakage in a vicinity of the cut portions 71, 72a, and 72b.

Vertical alignment films 11 and 21 are coated on inner surfaces of the panels 100 and 200, and polarizing plates 12 and 22 are provided to outer surfaces thereof.

The alignment films 11 and 21 may be a horizontal alignment film.

Transmission axes of the two polarizing plates 12 and 22 are perpendicular to each other, and one of the transmission axes are parallel to the gate lines 121. In case of a reflective liquid crystal display apparatus, one of the two polarizing plates 12 and 22 may be omitted.

Phase retardation films for compensating retardation of the liquid crystal layer 3 may be interposed between the panels 100 and 200 and the polarizers 12 and 22. The phase retardation films have birefringence and have a function of inversely compensating for the birefringence of the liquid crystal layer 3. As the retardation film, a uniaxial or biaxial optical film may be used, and particularly, a negative uniaxial optical film may be used.

The liquid crystal display apparatus may also include a backlight unit for supplying light to the polarizers 12 and 22, the phase retardation film, the panels 100 and 200, and the liquid crystal layer 3.

The liquid crystal layer 3 has a negative anisotropic permittivity, and the liquid crystal molecules 310 of the liquid crystal layer 3 are aligned so as for major axes thereof to be perpendicular to the surfaces of the two panels when no electric field is applied to the liquid crystal molecules 310. Accordingly, the incident light cannot transmit the perpendicular polarizers 12 and 22 to be shield.

When the common voltage and the data voltages are applied to the common electrode 270 and the first sub-pixel electrodes 190*a* and second sub-pixel electrode 190*b*, respectively, an electric field is generated in a direction substantially perpendicular to the surfaces of the panels. In response to the electric field, the liquid crystal molecules 310 have a tendency to change the major axes direction to be perpendicular to the direction of the electric field. However, the cut portions 71, 72*a*, 72*b*, 91, 92*a*, and 92*b* of the common electrode 270 and the first sub-pixel electrodes 190*a* and second sub-pixel electrode 190*b* and the slanted sides of the first sub-pixel electrodes 190*a* and second sub-pixel electrode 190*b* distort the electric field to generate an horizontal component which determines the tilted directions of the liquid crystal molecules. The horizontal components are perpendicular to the sides of the cut portions 71, 72*a*, 72*b*, 91, 92*a*, and 92*b* and the slanted sides of the first sub-pixel electrodes 190*a* and second sub-pixel electrode 190*b*. In addition, the horizontal components of the main electric fields at the two sides facing the cut portions 71, 72*a*, 72*b*, 91, 92*a*, and 92*b* have the opposite directions.

By using the electric field, the cut portions 71, 72*a*, 72*b*, 91, 92*a*, and 92*b* control the tilted directions of the liquid crystal molecules of the liquid crystal layer 3. The liquid crystal molecules which are located in domains defined by the adjacent cut portions 71, 72*a*, 72*b*, 91, 92*a*, and 92*b* or defined by the cut portions 72*a* and 72*b* and the right and left slanted sides of the first sub-pixel electrodes 190*a* and second sub-pixel electrode 190*b* are tilted in a direction perpendicular to the longitudinal directions of the cut portions 71, 72*a*, 72*b*, 91, 92*a*, and 92*b*. The two longest sides of the domains are substantially parallel to each other and have an angle of about ±45° with respect to the gate lines 121, and most of the liquid crystal molecules in the domains are tilted in four directions, so that the viewing angle is widened.

It is preferable that widths of the cut portions 71, 72*a*, 72*b*, 91, 92*a*, and 92*b* are in a range of from about 9 μm to about 12 μm.

At least one of the cut portions 71, 72*a*, 72*b*, 91, 92*a*, and 92*b* may be replaced with protrusions (not shown) or recessed portions. The protrusions may be made of an organic material or an inorganic material and disposed over or under the electric field generating electrodes 190*a*, 190*b*, and 270. Widths of the protrusions are preferably in a range of from about 5 μm to about 10 μm.

However, if the tilted direction of the liquid crystal molecules 310 has an angle of 45° with respect to the transmission axes of the polarizers 12 and 22, higher brightness can be obtained. In the embodiment, the tilted direction of the liquid crystal molecules 310 has an angle of 45° with respect to the gate lines 121, and the gate lines 121 are perpendicular or parallel to edges of the panels 100 and 200. Therefore, when the polarizers 12 and 22 are attached so as for the transmission axes thereof to be perpendicular or parallel to the edges of the panels 100 and 200, the highest brightness can be obtained, and the polarizers 12 and 22 can be manufacture with low cost.

In the liquid crystal display apparatus according to the embodiment, as described above, the second sub-pixel electrode 190*b* is electromagnetically coupled (capacitively coupled) with the first sub-pixel electrodes 190*a*. Referring to FIG. 7, the first sub-pixel electrode 190*a* is connected through the drain electrode 175 to the thin film transistor Q to receive image signal voltage transmitted through the thin film transistor Q and the data line 171.

In contrast, the voltage of the second sub-pixel electrode 190*b* changes due to the capacitive coupling with the first sub-pixel electrode 190*a*. In the embodiment, an absolute value of the voltage of the second sub-pixel electrode 190*b* is always lower than the voltage of the first sub-pixel electrode 190*a*. The reason thereof is as follows.

In FIG. 7, Clca denotes a liquid crystal capacitance formed between the first sub-pixel electrode 190*a* and the common electrode 270, and Csta denotes a storage capacitance formed between the first sub-pixel electrode 190*a* and the storage electrode line 131. Clcb denotes a liquid crystal capacitance formed between the second sub-pixel electrode 190*b* and the common electrode 270, and Cstb denotes a storage capacitance formed between the second sub-pixel electrode 190*b* and the storage electrode line 131. Ccp denotes a coupling capacitance formed between the second sub-pixel electrode 190*b* and the first sub-pixel electrode 190*a*.

Assuming that the voltages of the first sub-pixel electrodes 190*a* and second sub-pixel electrode 190*b* with respect to a voltage of the common electrode 270 are denoted by Va and Vb, respectively, the following equation is obtained according to the voltage division rule.

$$Vb = Va \times [Ccp/(Ccp+Clcb+Cstb)]$$

Here, since the Ccp/(Ccp+Clcb+Cstb) is not larger than 1, Vb is always smaller than Va. At this time, the voltage of the common electrode 270 and the voltage of the storage electrode lines 131*a* and 131*b* with respect to the Clca and Clcb may vary. Even in this case, the voltages of the common electrode 270 applied to the Clca and the Clcb are equal to each other, the absolute value of the image signal voltage Va applied to the Clca is always lager than the absolute value of the image signal voltage Vb applied to the Clcb. In view of this, because the two pixel electrodes in the same pixel are at different voltages, the liquid crystal molecules are driven with different voltages, so that the liquid crystal molecules within the pixel are tilted with different tilted angles. As a result, side visibility is improved.

By adjusting the Ccp, a ratio of Vb to Va can be adjusted. The Ccp can be adjusted by adjusting the overlap area and distance between the capacitive coupling electrodes 176*a* and 176*b* and the second sub-pixel electrode 190*b*. The overlap area can be adjusted by changing the width of the capacitive coupling electrodes 176, and the distance can be adjusted by changing the formation positions of the capacitive coupling electrodes 176. Namely, in the one embodiment of the present invention, although the capacitive coupling electrodes 176 are formed in the same layer as the data lines 171, in another embodiment the distance between the capacitive coupling electrodes 176 and the second sub-pixel electrode 190*b* can be increased by forming the capacitive coupling electrodes 176 using the same layer of material which is used to form gate lines 121. In this case, the Vb is 0.6 to 0.8 times larger than the Vb.

Alternatively, in another embodiment, a voltage of which absolute value is always larger than the voltage of the first sub-pixel electrodes 190*a* may be applied to the second sub-pixel electrode 190*b*. This is implemented by capacitively-coupling the second sub-pixel electrode 190*b* with the first sub-pixel electrodes 190*a* in a state that an arbitrary voltage such as common voltage is applied to the second sub-pixel electrode 190*b*.

The area ratio of the second sub-pixel electrode 190*b* applied with a higher or lower pixel voltage to the first sub-pixel electrodes 190*a* to which the image signal is directly transmitted is preferably in a range of 1:0.85 to 1:1.15.

The two second sub-pixel electrodes 190*b* are capacitively coupled with the first sub-pixel electrode 190*a*.

As described above, the liquid crystal display apparatus according to the embodiment of the present invention has the pixels A and B where the first sub-pixel electrodes 190*a* and second sub-pixel electrode 190*b* and the cut portions 71, 72*a*, and 72*b* of the common electrode 270 are arrayed in a mirror-like symmetrical structure as shown in FIGS. 3 and 6. Here, the pixels A and B may be arrayed in various manners, which are described with reference to the drawings.

FIG. 8 is a view showing a layout of a pixel array structure in a liquid crystal display apparatus according to an embodiment of the present invention, and FIG. 9 is a view showing a layout of a pixel array structure in a liquid crystal display apparatus according to another embodiment of the present invention.

As shown in FIG. 8, in the liquid crystal display apparatus according to the embodiment of the present invention, the same pixels A and B are arrayed in the row direction, but the pixels A and B are arrayed alternately in the column direction.

On the other hand, unlike the aforementioned embodiment, as shown in FIG. 9, in the liquid crystal display apparatus according to other embodiment of the present invention, the pixels A and B are arrayed alternately in units of two rows.

In the liquid crystal display apparatus according to the embodiment of the present invention, the pixels A and B where the first sub-pixel electrodes 190*a* and second sub-pixel electrode 190*b* and the cut portions 71, 72*a*, and 72*b* of the common electrode 270 are arrayed in a left-right symmetrical structure are alternately arrayed. Therefore, the domains where the liquid crystal molecules are tilted with different tilted angles are disposed in a left-right symmetrical structure, the asymmetry is removed, and uniform visibility can be secured. As a result, asymmetrical arraignment of the cut portions 71, 72*a*, and 72*b* of the common electrode 270 for solving the left-right asymmetrical visibility is not needed, and the aperture ratio can be maximized.

Here, if the areas or numbers of the pixels A and B which are arrayed in the left-right symmetrical structure over the entire thin film transistor panel are the same, the pixel array may be modified in various manners. In addition, three or more pixels having different array structures may be provided.

A liquid crystal display apparatus according to another embodiment of the present invention is described below with reference to FIGS. 10 and 11.

Figure 10:
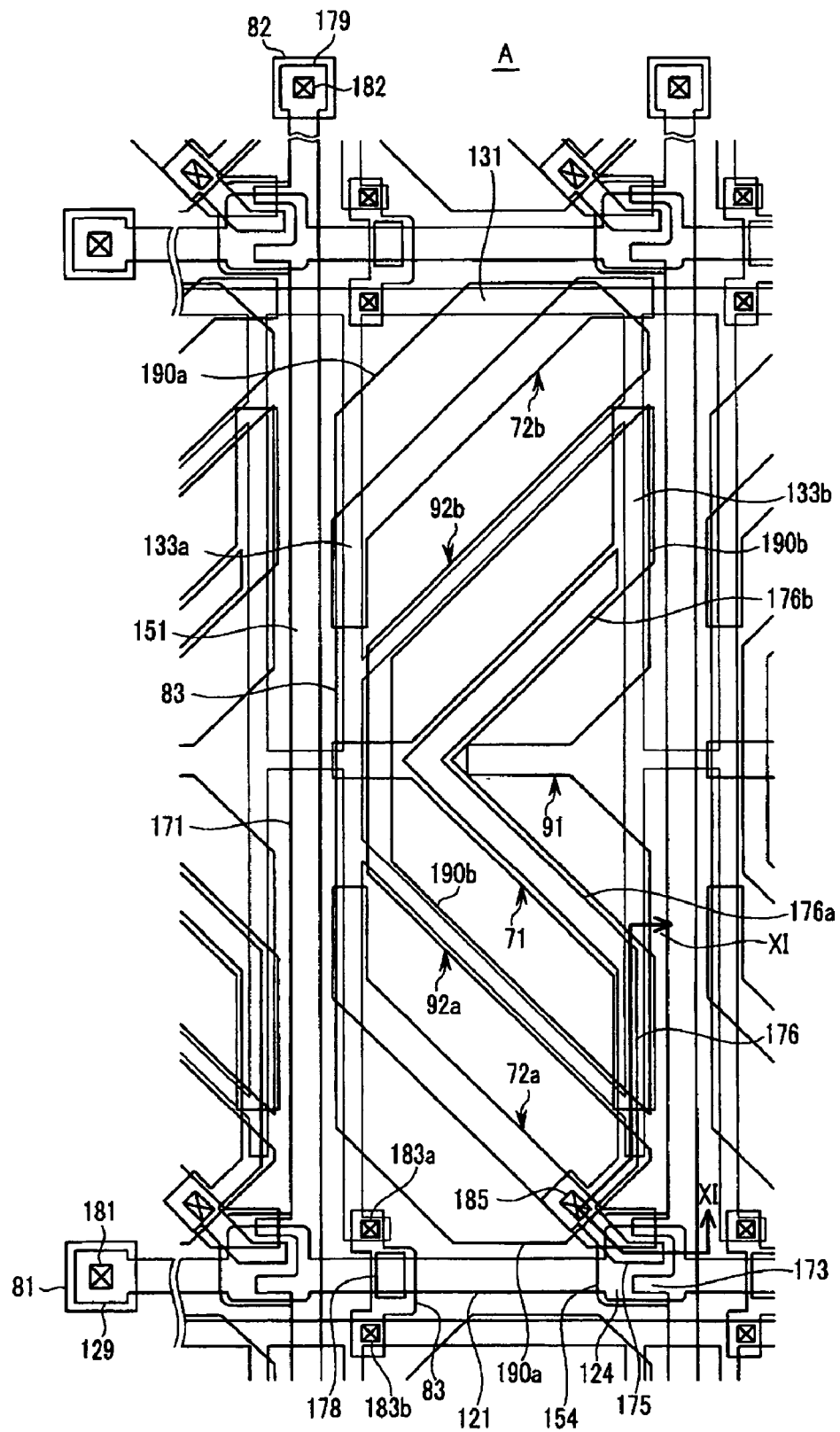
FIG. 10 is a view showing a layout of a structure of a pixel of a liquid crystal display apparatus according to another embodiment of the present invention.
Figure 11:
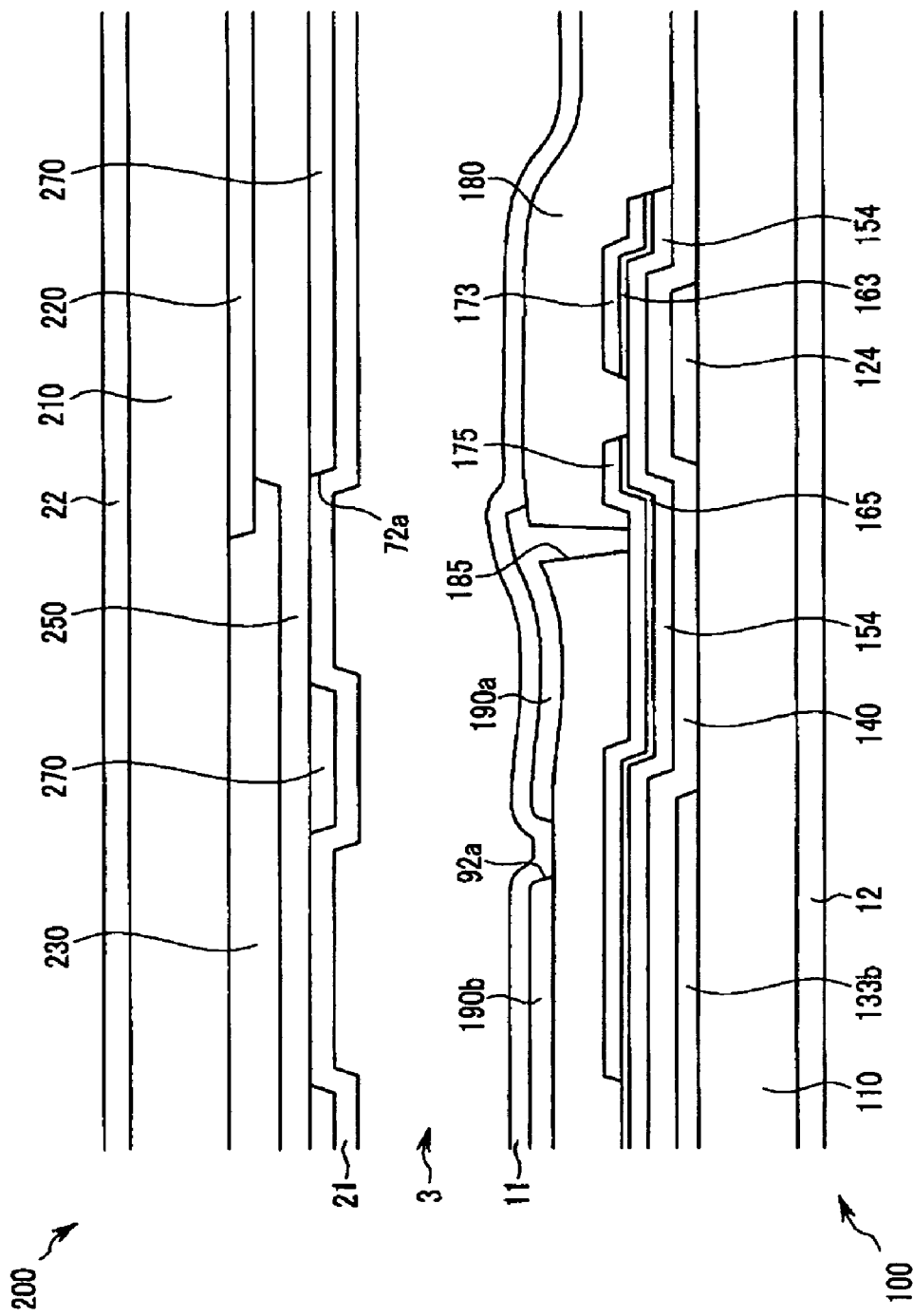
FIG. 11 is a cross sectional view showing the liquid crystal display apparatus taken along line IX-IX' of FIG. 10.

FIG. 10 is a view showing a layout of a structure of a pixel of a liquid crystal display apparatus according to another embodiment of the present invention, and FIG. 11 is a cross sectional view showing the liquid crystal display apparatus taken along line XI-XI' of FIG. 10.

Referring to FIGS. 10 and 11, the liquid crystal display apparatus according to the embodiment includes a thin film transistor panel 100, a common electrode panel 200, a liquid crystal layer 3 interposed between the two panels 100 and 200, and a pair of polarizers 12 and 22 attached on outer surfaces of the two panels 100 and 200.

The layered structures of the panels 100 and 200 according to the embodiments are substantially the same as the layered structures of FIGS. 1 to 6.

In the thin film transistor panel 100, a plurality of gate lines 121 including gate electrodes 124 and a plurality of storage electrode lines 131 including first to fourth storage electrodes 133*a*, 133*b*, 133*c*, and 133*d* are formed on a substrate 110, and a gate insulating film 140, line-shaped semiconductors 151, and ohmic contact members 161 and 165 are sequentially formed thereon. A plurality of data lines 171 including source electrodes 173 and a plurality of drain electrodes 175 including a plurality of capacitive coupling electrodes 176 are formed on the gate insulating film 140, and a protective film 180 is formed thereon. On the protective film 180 and the gate insulating film 140, a plurality of contact holes 181, 182, and 185 are formed. A plurality of the first sub-pixel electrodes 190*a* and second sub-pixel electrodes 190*b* and a plurality of contact assistant members 81 and 82 are formed on the protective film 180, and an alignment film 11 is coated thereon.

In the common electrode panel 200, a light-shielding member 220, a plurality of color filters 230, a cover film 250, a common electrode 270, and an alignment film 21 are formed on a dielectric substrate 210.

Unlike the liquid crystal display apparatus of FIGS. 1 to 6, the line-shaped semiconductors 151 have the same shape as the data lines 171, the drain electrodes 175, and underlying ohmic contact members 161 and 165. However, among the line-shaped semiconductors 151, protrusions 154 have portions uncovered by the data lines 171 and the drain electrodes 175 such as portions between the source electrodes 173 and the drain electrodes 175, the line-shaped semiconductors 151 and the island-shaped ohmic contact members 165 extend up to lower portions of the capacitive coupling electrodes 176 with the same shapes.

The features according to the embodiment may be applied to the liquid crystal display apparatus shown in FIGS. 1 to 5.

Figure 12:
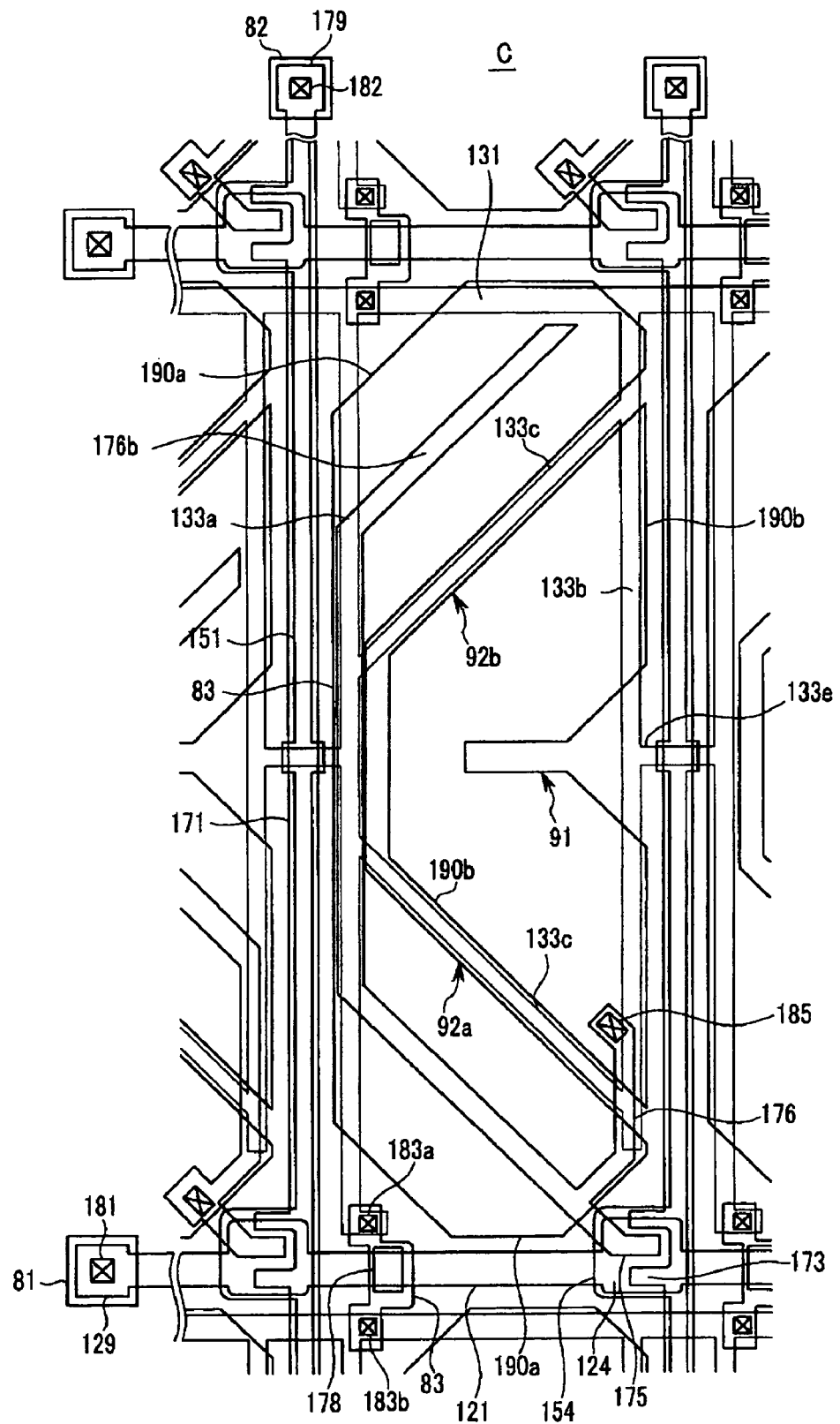
FIG. 12 is a view showing a layout of a pixel C in a thin film transistor panel for a liquid crystal display apparatus according to another embodiment of the present invention.
Figure 13:
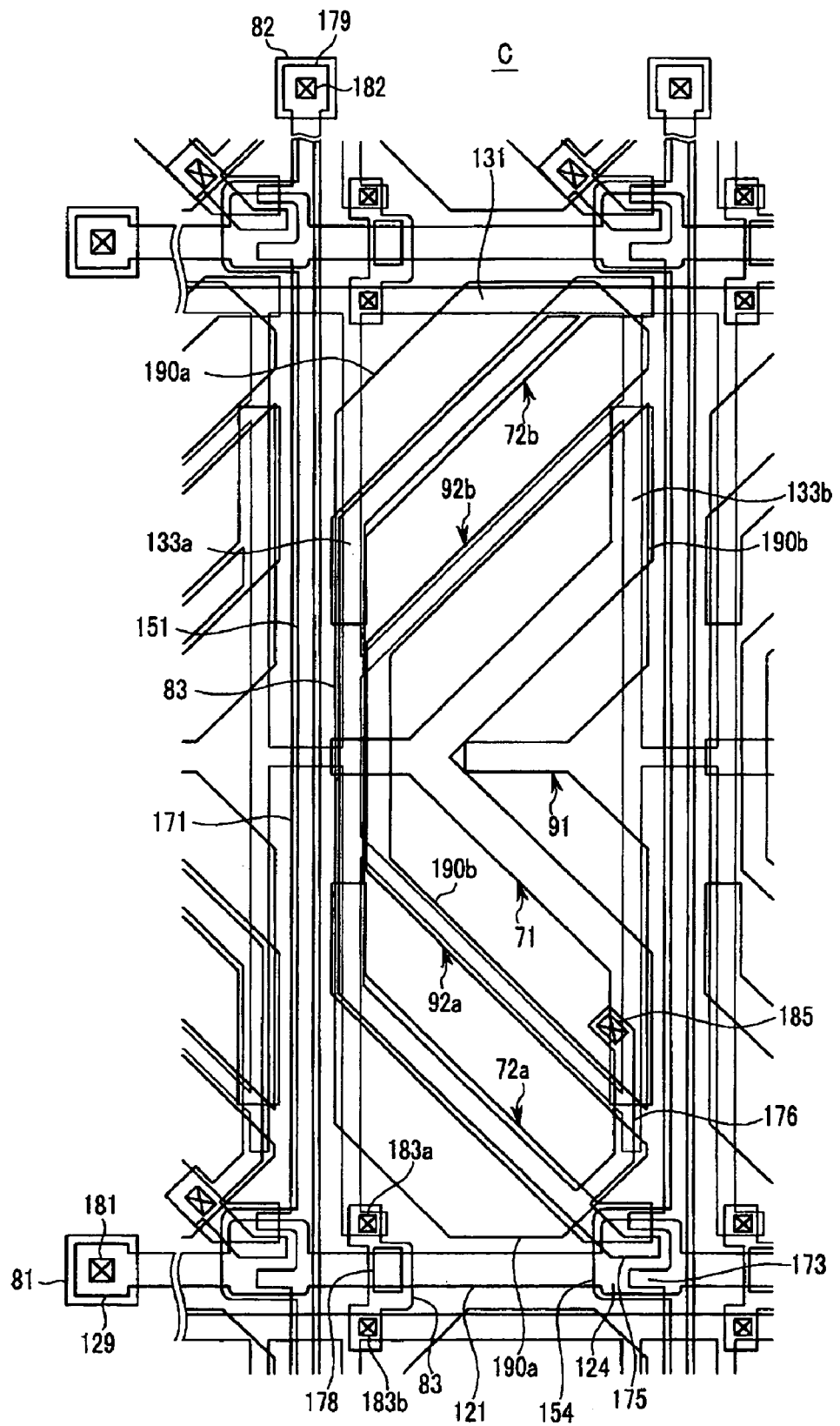
FIG. 13 is a view showing a layout of a liquid crystal display apparatus using two panels of the type illustrated in FIGS. 12 and 2 according to another embodiment of the present invention.
Figure 14:
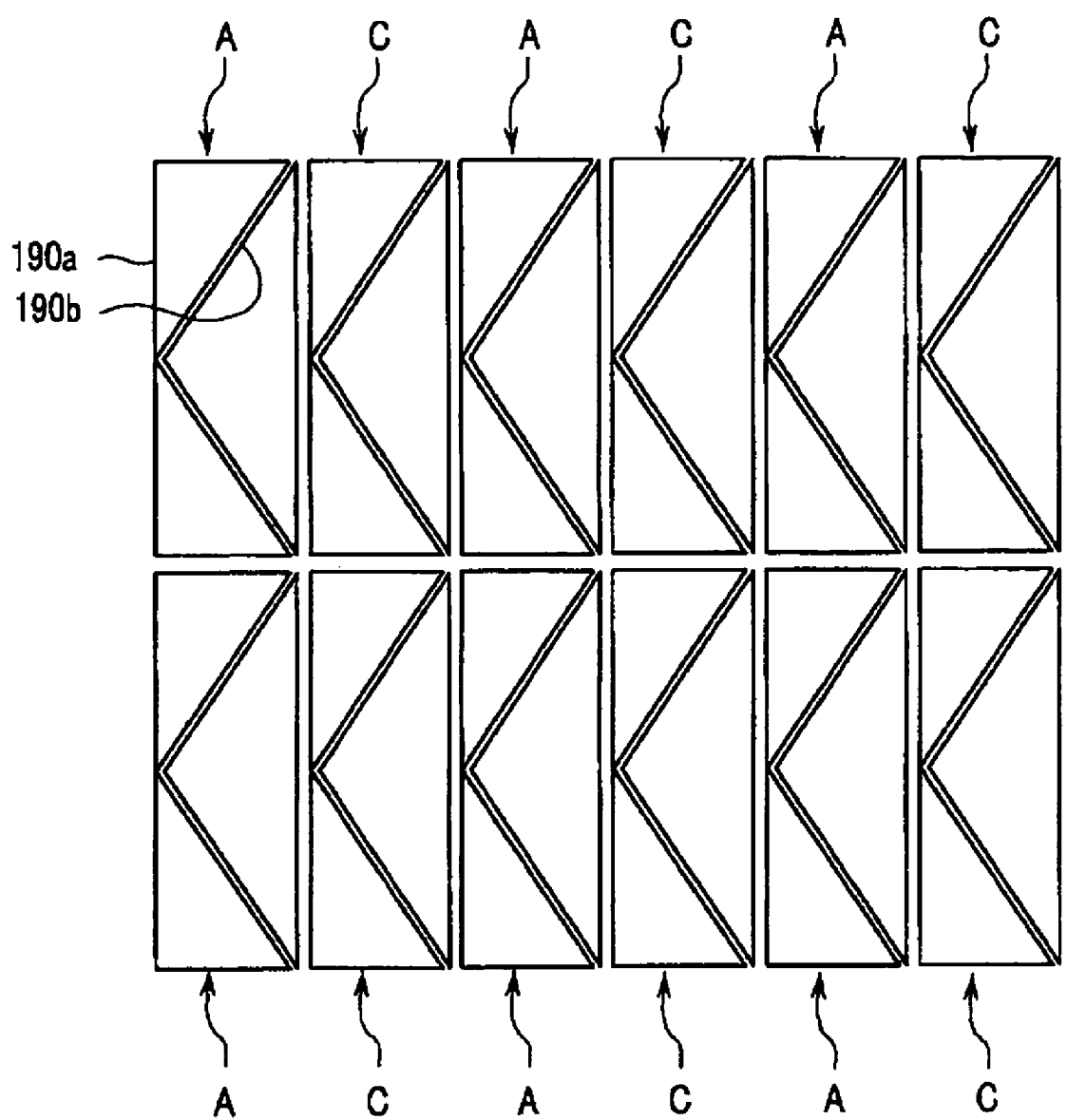
FIG. 14 is a view showing a layout of a pixel array structure in a liquid crystal display apparatus according to another embodiment of the present invention.
Figure 15:
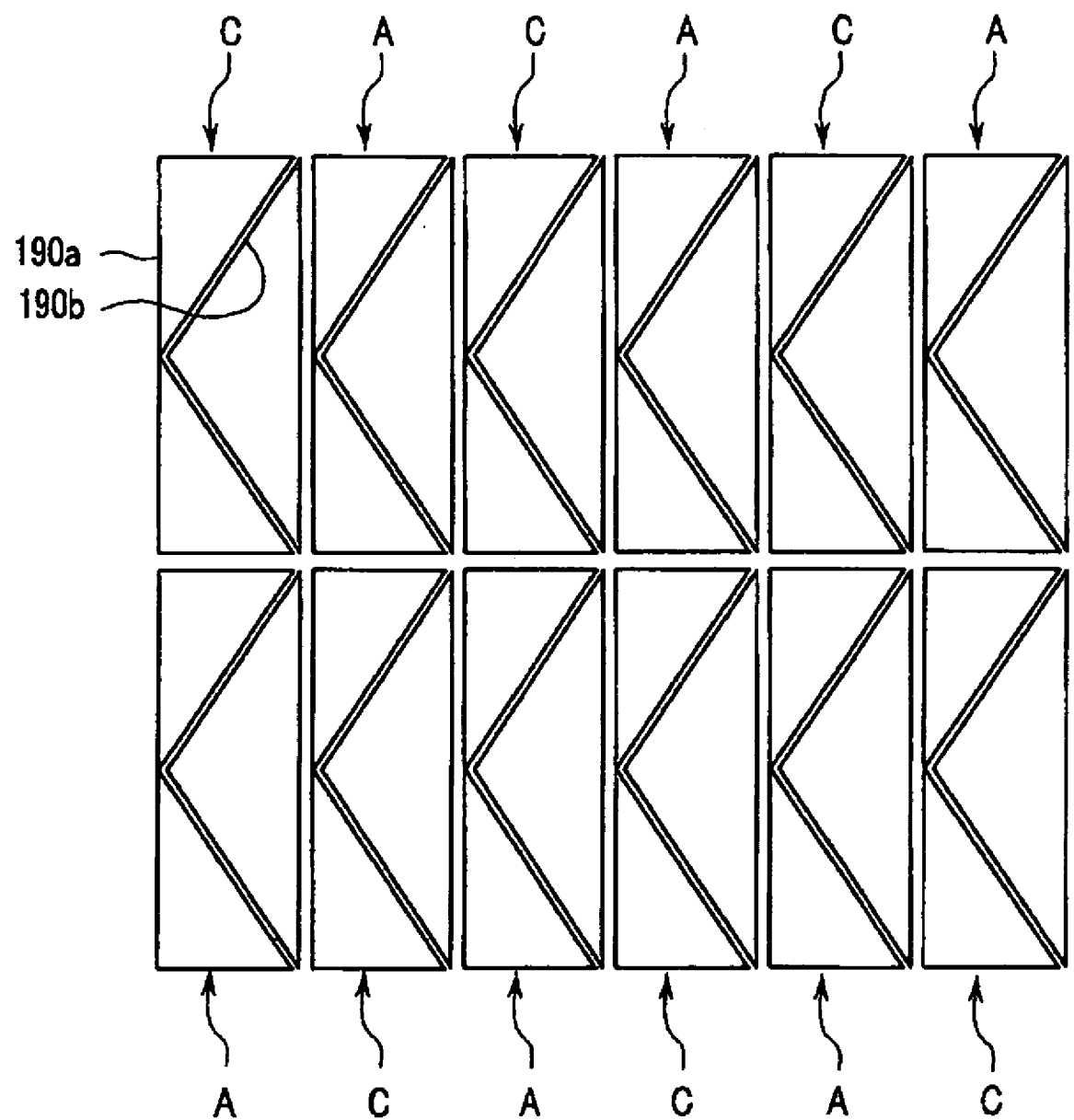
FIG. 15 is a view showing another layout of a pixel array structure of a liquid crystal display apparatus according to another embodiment of the present invention.

FIG. 12 is a view showing a layout of a pixel C in a thin film transistor panel for a liquid crystal display apparatus according to another embodiment of the present invention, FIG. 13 is a view showing a layout of a liquid crystal display apparatus constructed using panels of the type disclosed in FIGS. 12 and 2 according to another embodiment of the present invention. FIG. 14 is a view showing a layout of a pixel array structure in a liquid crystal display apparatus according to another embodiment of the present invention, and FIG. 15 is a view showing another layout of a pixel array structure of a liquid crystal display apparatus according to another embodiment of the present invention.

The structure of a pixel C of the liquid crystal display apparatus according to another embodiment of the present invention shown in FIGS. 12 and 13 is different from the pixel A of FIG. 3, as follows.

Namely, the second sub-pixel electrodes 190*b* are directly connected through the contact holes 185 to the drain electrodes 175 to receive the data voltages and the first sub-pixel electrodes 190*a* overlap with the capacitive coupling electrodes 176*a* and 176*b* connected to the second sub-pixel electrodes 190*b*. Therefore, the first sub-pixel electrodes 190*a* are electromagnetically coupled (capacitively coupled) with the second sub-pixel electrodes 190*b*.

In the embodiments having A type pixels, the first pixel electrodes 190a serve as main pixels, and the second pixel electrodes 190b serve as sub-pixels. In the type C pixels, the first pixel electrodes 190a serve as sub-pixels, and the second pixel electrodes 190b serve as main pixels.

In a liquid crystal display apparatus constructed with the pixels A, since the main and sub-pixels are sequentially disposed at the same positions, the left sides of the data lines 171 become the main pixels 190a, that is, high voltage regions, and right sides thereof become the sub-pixels 190b, that is, low voltage regions. Therefore, as seen from the left and right sides, the amount of transmitting light is seen to be different from each other, so that a difference between left and right visibilities occurs.

Namely, when one pixel is seen from the right side, due to a relatively low brightness, gamma distortion for voltages is seen to be small. On the contrary, when one pixel is seen form the left side, due to a relatively high brightness, gamma distortion is seen to be large. As a result, the difference between the left and right visibilities occurs.

In order to avoid the difference, in another embodiment of the present invention, the pixels A and C are repeatedly disposed as shown in FIG. 14. In this case, the main pixels 190a of the pixels A and the main pixels 190b of the pixels C are disposed at the left and right sides of the data lines 171, and the sub-pixels 190b of the pixels A and the sub-pixels 190a of the pixels C are disposed at the left and right sides of the data lines 171.

Therefore, since the same voltages are applied to the adjacent pixels, the difference between the left and right brightness does not occur, so that the difference between the left and right visibilities does not occur.

In addition, as shown in FIG. 15, the main sub-pixels 190a of the pixels A are disposed so as not to be adjacent to the same pixels A in up, down, left, and right directions, so that the sub-pixels are not serially connected to each other in the up and down directions, and the main and sub-pixels are alternately disposed in the up and down directions. Therefore, the overall mixed array can be obtained.

As a result, such a strip pattern in the up and down directions can be prevented, so that the problem of the left-right and up-down asymmetry visibility caused by the side light leakage and texture can be solved.

The embodiment of the present invention can be applied to a case where area ratios of the main and sub-pixels are different as well as a case where the area ratios thereof are equal. In addition, the embodiment can be applied to a case where the pixel is divided into plural regions as well as a case where the pixel is divided into two regions.

Alternatively, although the embodiment corresponds to a scheme where the main and sub-pixels are separated by using one thin film transistor are electromagnetically coupled, the present invention can be applied to a scheme where the main and sub-pixels are separately driven by connecting the thin film transistors in the respective domains.

Figure 16:
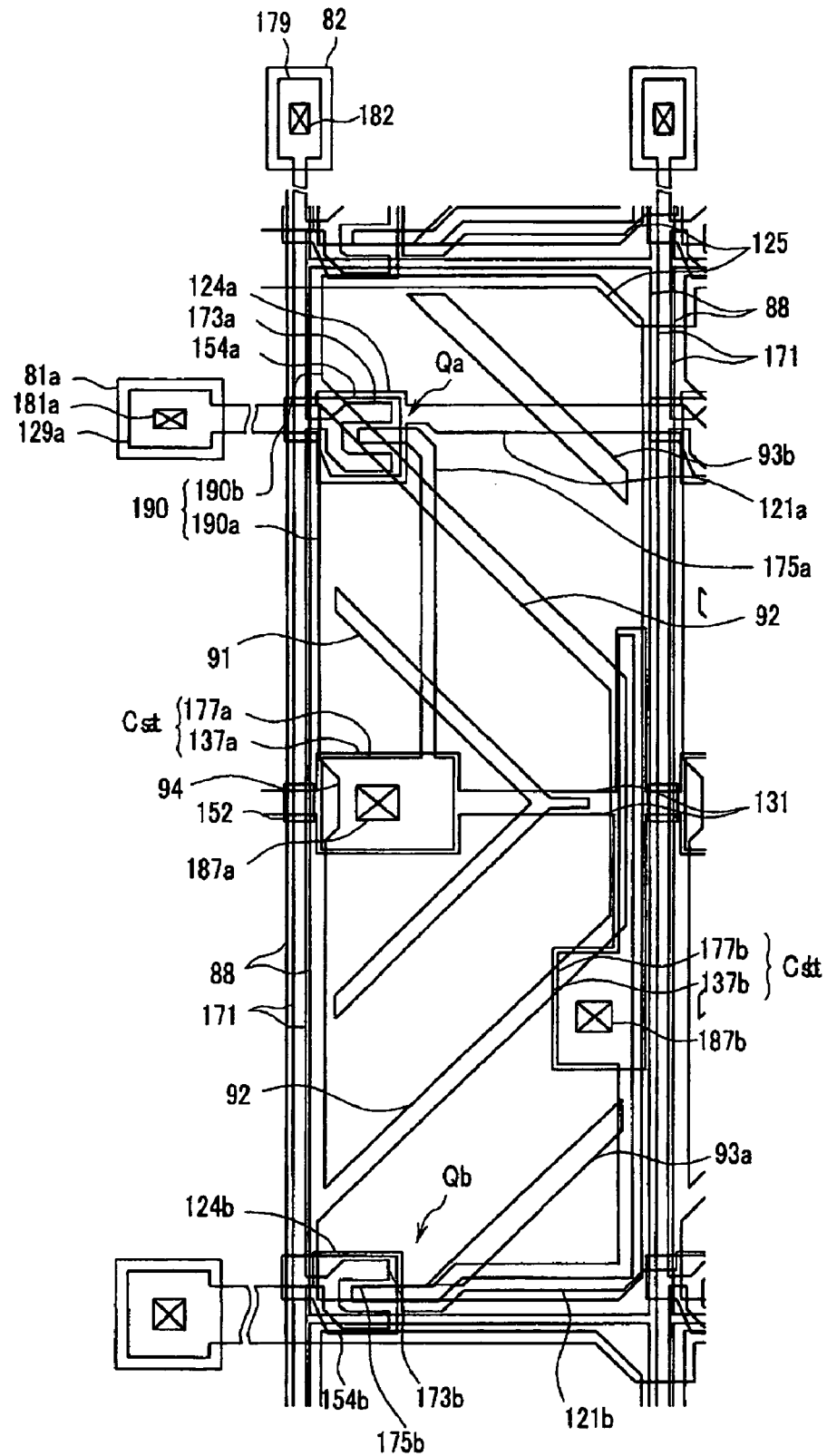
FIG. 16 is a view showing a layout of a structure of a pixel D or E in a thin film transistor panel of a liquid crystal display apparatus according to another embodiment of the present invention.
Figure 17:
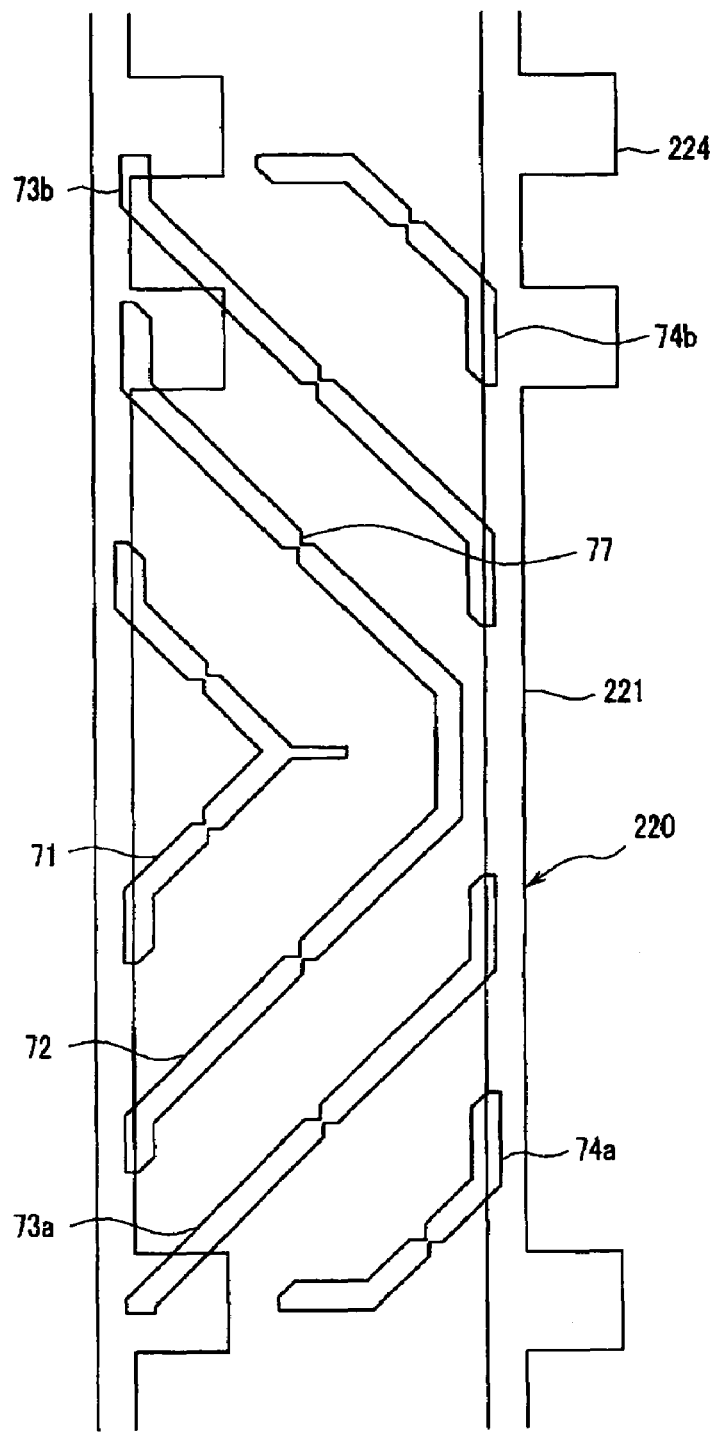
FIG. 17 is a view showing a layout of a structure of a pixel in a common electrode panel for a liquid crystal display apparatus according to another embodiment of the present invention.
Figure 18:
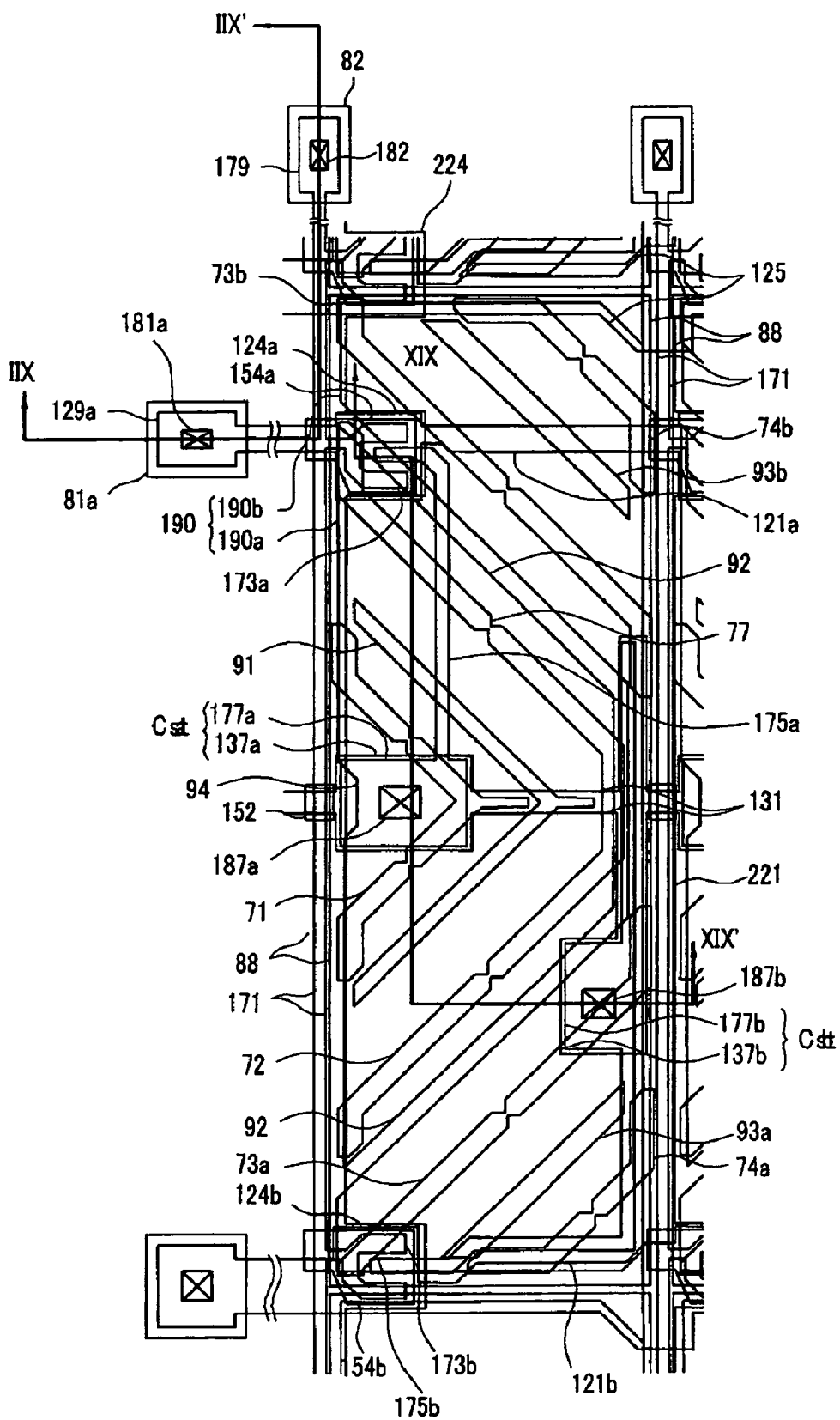
FIG. 18 is a view showing a layout of a liquid crystal display apparatus having the two panels of the type illustrated in FIGS. 16 and 17 according to another embodiment of the present invention.
Figure 19:
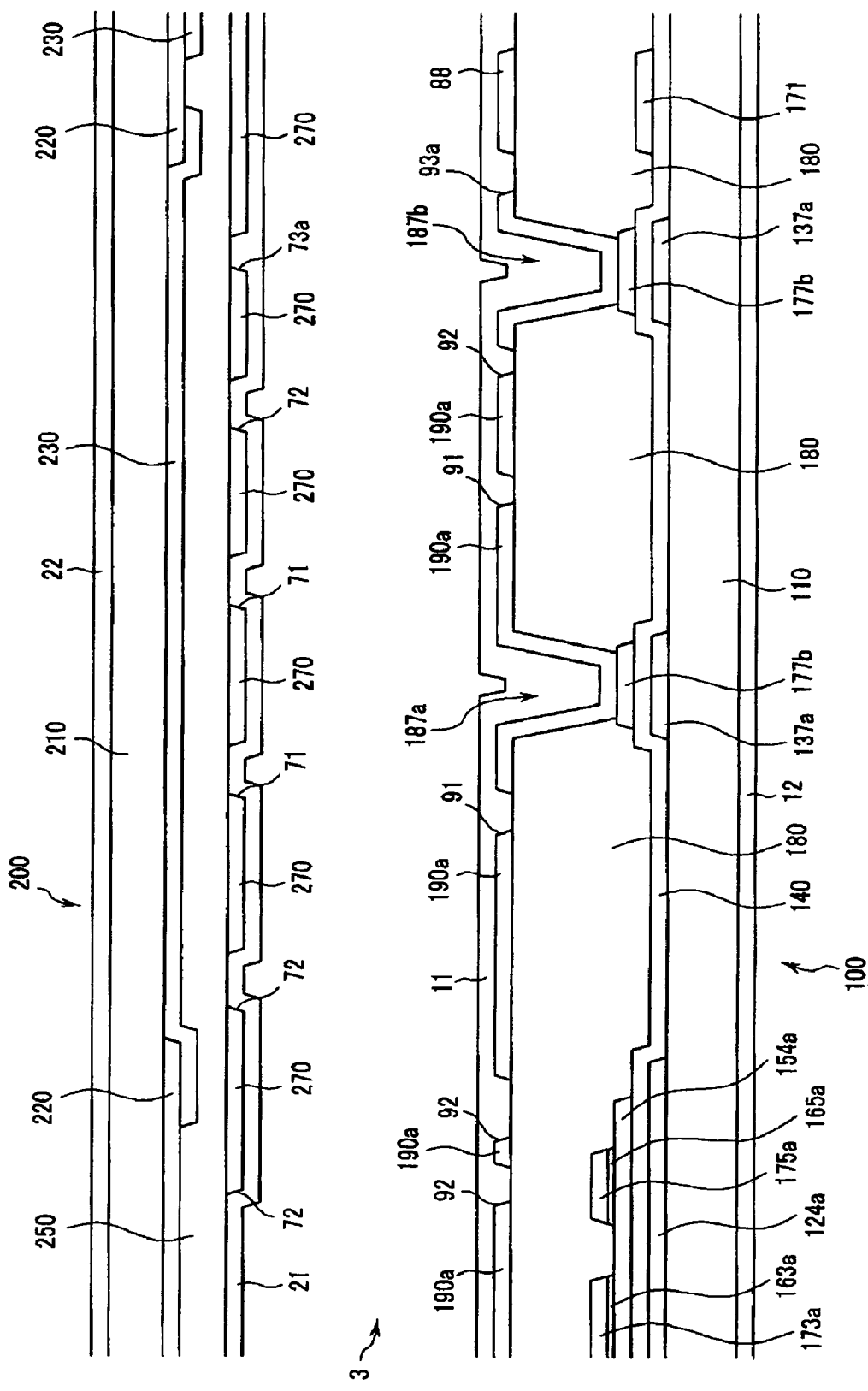
FIGS. 19 and 20 are cross sectional views showing the liquid crystal display apparatus taken along lines XIX-XIX' and IIX-IIX' of FIG. 18, respectively.
Figure 20:
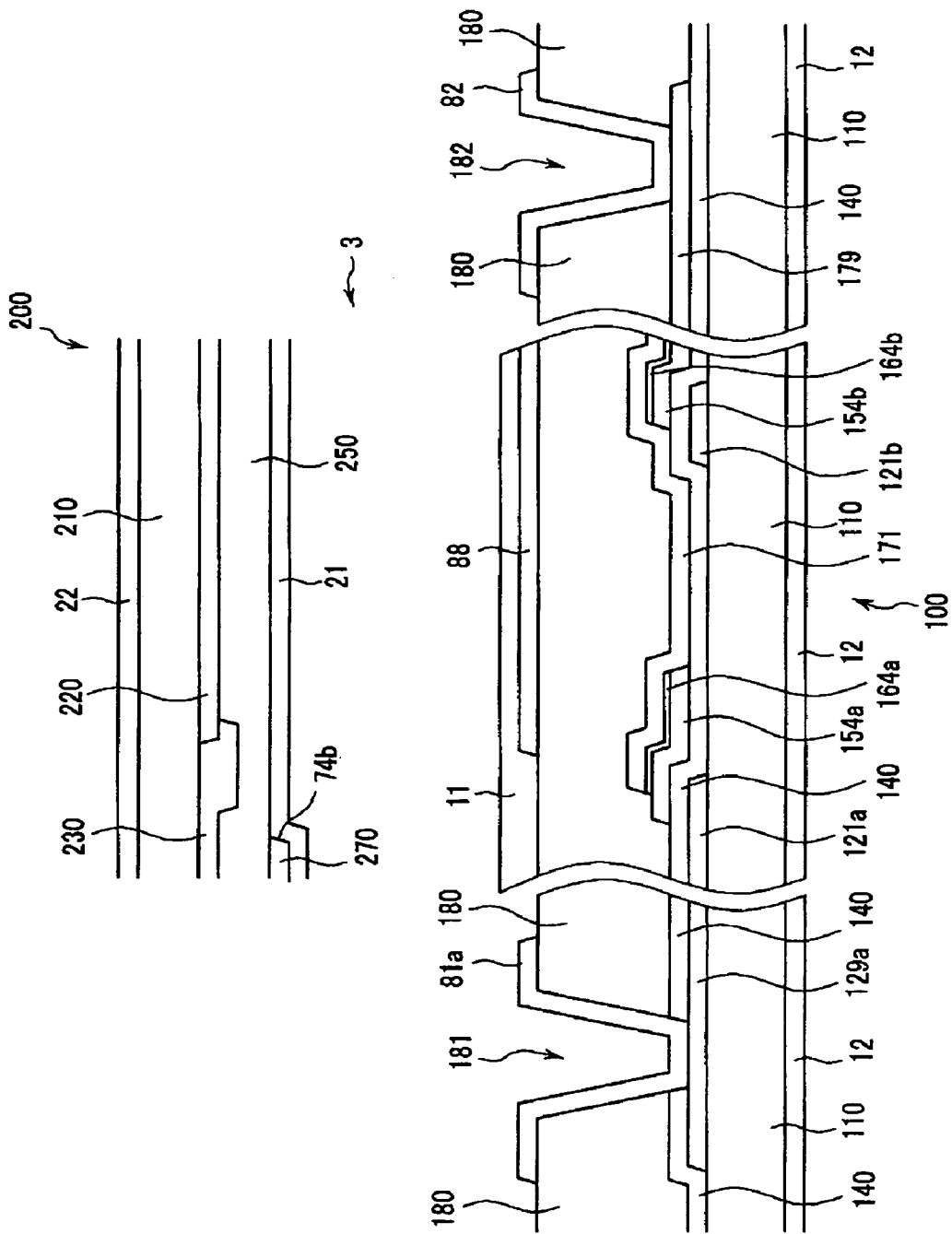
Figure 21:
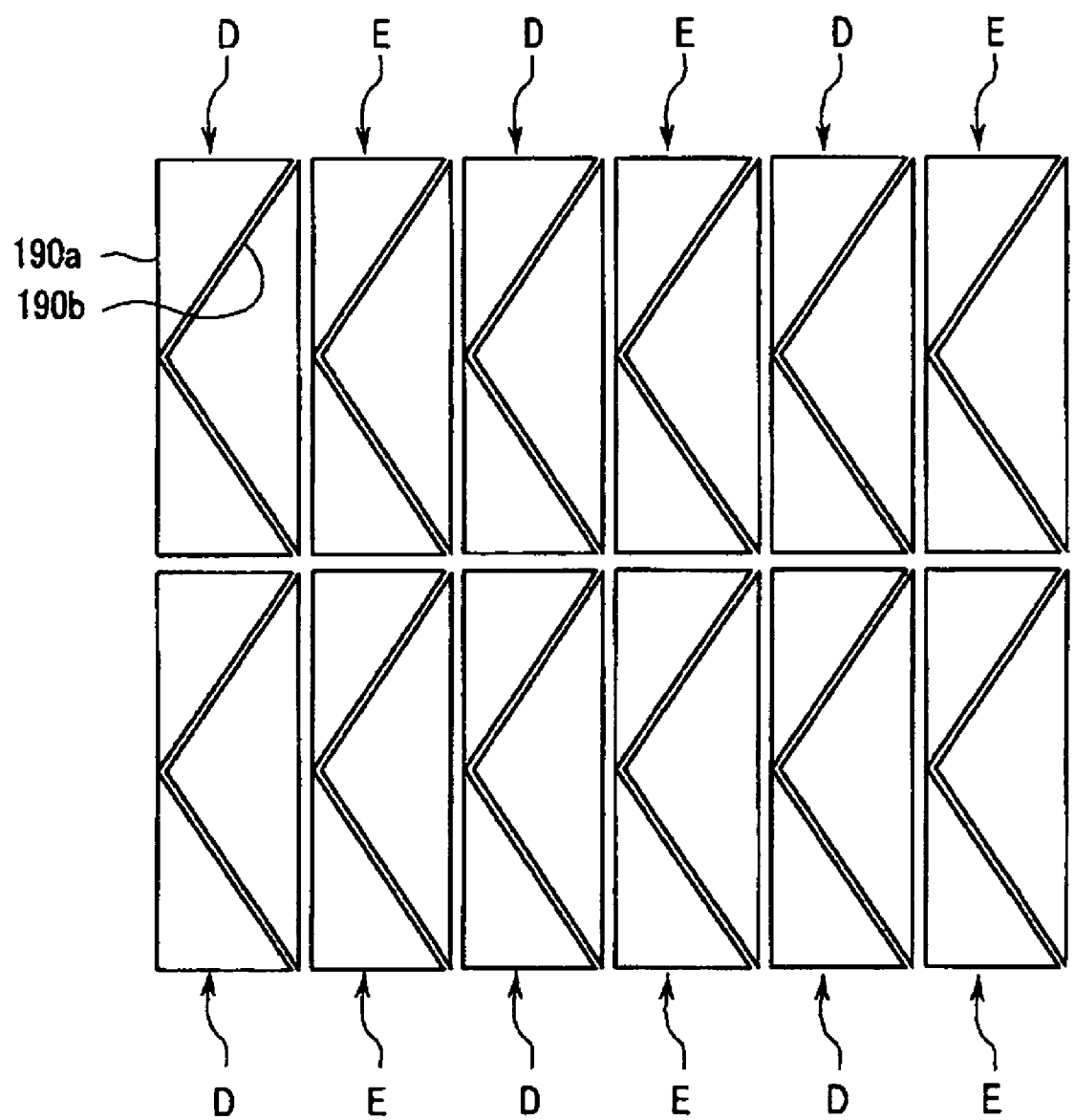
FIG. 21 is a view showing a layout of a pixel array structure in a liquid crystal display apparatus according to another embodiment of the present invention.
Figure 22:
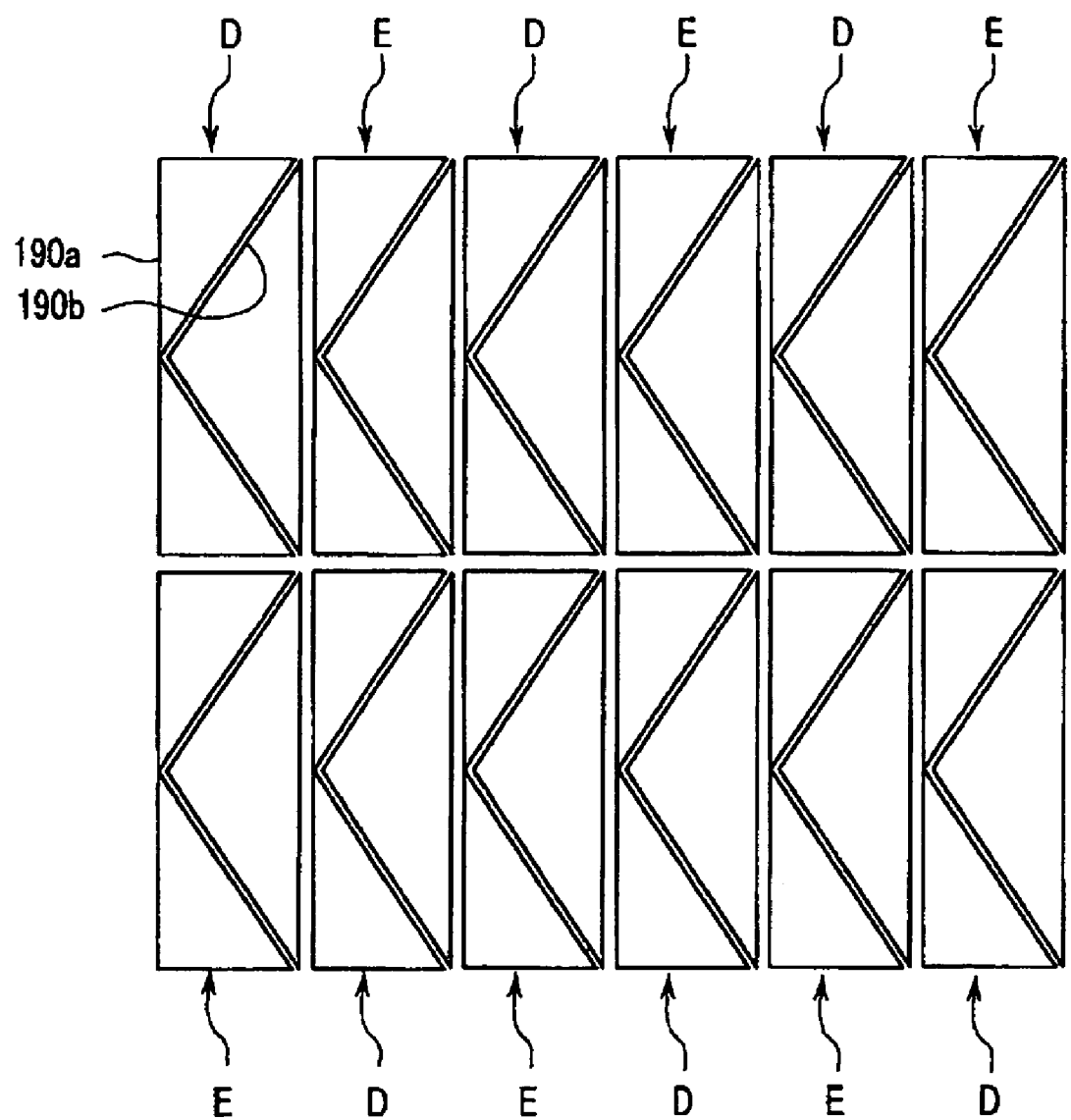
FIG. 22 is a view showing a layout of another pixel array structure in a liquid crystal display apparatus according to another embodiment of the present invention.

FIG. 16 is a view showing a layout of a structure of a pixel D or E in a thin film transistor panel of a liquid crystal display apparatus according to another embodiment of the present invention, FIG. 17 is a view showing a layout of a structure of a pixel in a common electrode panel for a liquid crystal display apparatus according to another embodiment of the present invention. FIG. 18 is a view showing a layout of a liquid crystal display apparatus using a panel of the type shown in FIG. 16 and a panel of the type shown in FIG. 17 according to another embodiment of the present invention. FIGS. 19 and 20 are cross sectional views showing the liquid crystal display apparatus taken along lines XIX-XIX' and IIX-IIX' of FIG. 18, respectively. FIG. 21 is a view showing a layout of a pixel array structure in a liquid crystal display apparatus according to another embodiment of the present invention, and FIG. 22 is a view showing a layout of another pixel array structure in a liquid crystal display apparatus according to another embodiment of the present invention.

As shown in FIGS. 16 to 20, a plurality of pairs of first and second gate lines (gate lines) 121a and 121b and a plurality of storage electrode lines (storage electrode lines) 131 are formed on a dielectric substrate 110 made of a transparent glass or the like.

The gate lines 121a and 121b main extend in the longitudinal direction and are physically and electrically separated from each other to transmit gate signals. The first and second gate lines 121a and 121b include a plurality of first and second gate electrodes 124a and 124b which are disposed in upper and lower regions and protrude downward and upward and end portions 129a and 129b having wide areas for connection to other layers or external driving circuits. In addition, the second gate lines 121b include protrusions 125 which are enlarged upward and downward, and the protrusions 125 have boundaries which are slanted with an angle of ±45° with respect to the gate lines 121a and 121b.

The storage electrode lines 131 mainly extend in the longitudinal direction and are close to the first gate lines 121a rather than the second gate lines 121b. The storage electrode lines 131 include a plurality of pairs of first and second storage electrodes 137a and 137b, and the second storage electrodes 137b have a larger length and a smaller width than the first storage electrodes 137a.

However, the shapes and arrangement of the storage electrodes 137a and 137b and the storage electrode lines 131 may be modified in various types.

The gate lines 121 and the storage electrode lines 131 may be made of an aluminum based metal such as aluminum (Al) and an aluminum alloy, a silver based metal such as silver (Ag) and a silver alloy, a copper based metal such as copper (Cu) and copper alloy, a molybdenum based metal such as molybdenum (Mo) and a molybdenum alloy, chromium (Cr), titanium (Ti), or tantalum (Ta). However, the gate lines 121 and the storage electrode lines 131 may have a multi-layered structure including two conductive layers (not shown) having different physical properties. One of the two conductive layers is made of a metal having a low resistivity, for example, an aluminum based metal, a silver based metal, and a copper based metal, in order to reduce signal delay or voltage drop of the gate lines 121 and the storage electrode lines 131. The other conductive layer is made of a material having a good contactness to other materials, particularly, ITO (indium tin oxide) and IZO (indium zinc oxide) such as a molybdenum based metal, chromium, titanium, and tantalum. As a preferred example of the combination, there are a combination of a lower chromium layer and an upper aluminum layer and a combination of a lower aluminum layer and an upper molybdenum layer. However, the gate lines 121 and the storage electrode lines 131 may be made of various metals and conductive materials.

In addition, side surfaces of the gate lines 121 and the storage electrode lines 131 are slanted with respect to a surface of the substrate 110, and it is preferable that the slanted angle is in a range of 30° to 80°.

A gate insulating layer 140 made of a silicon nitride $SiN_x$ or the like is formed on the gate lines 121a and 121b and the storage electrode lines 131.

A plurality of island-shaped semiconductors 154a, 154b, and 152 made of a hydrogenated amorphous silicon are formed above the gate insulating film 140. The island-shaped semiconductors 154a and 154b are mainly disposed over the gate electrodes 124a and 124b.

A plurality of island-shaped ohmic contact members 163a, 163b, 165a, and 165b made of a silicide or an n+hydrogenated amorphous silicon or the like which are doped with n type impurities such as phosphorus (P) are formed above the semiconductors 154a and 154b. The two pairs of the island-shaped ohmic contact members 163a, 163b, 165a, and 165b are disposed on the semiconductors 154a and 154b and face each to each other with respect to the gate electrode 124a and 124b as a center thereof.

Side surfaces of the semiconductors 154a, 154b, and 152 and the ohmic contact members 163a, 163b, 165a, and 165b are also slanted with respect to the surface of the substrate 110, and the slanted angle is in a range of 30 20 to 80°.

A plurality of data lines 171 and a plurality of first and second drain electrodes 175a and 175b are formed on the ohmic contact members 163a, 163b, 165a, and 165b and the gate insulating film 140.

The data lines 171 mainly extend in the transverse direction to intersect the gate lines 121 and the storage electrode lines 131 and apply the data voltages thereto. The data lines 171 have a plurality of first and second source electrodes 173a and 173b which extend toward the first and second drain electrodes 175a and 175b and end portions 179 which have enlarged widths for connection to other layers or external apparatuses.

The first and second drain electrodes 175a and 175b have enlarged portions 177a and 177b having a large area which extend from bar-shaped end portions on the semiconductors 154a and 154b and overlap with the first and second storage electrodes 137a and 137b. The source electrodes 173a and 173b are curved to surround the bar-shaped end portions of the drain electrodes 175a and 175b. The first and second gate electrodes 124a and 124b, the first and second source electrodes 173a and 173b, and the first and second drain electrodes 175a and 175b together with the island-shaped semiconductors 154a and 154b constitute the first and second thin film transistors (TFTs) Qa and Qb, and channels of the thin film transistors Qa and Qb are formed on the semiconductors 154a and 154b between the first and second source electrodes 173a and 173b and the drain electrodes 175a and 175b.

The data lines 171 and the drain electrodes 175a and 175b are made of, preferably, chromium, a molybdenum based metal, or a refractory metal such as tantalum and titanium and may have a multi-layered structure which is constructed with a lower layer (not shown) made of the refractory metal and an upper layer (not shown) made of a low resistance material disposed thereon. As an example of the multi-layered structure, in addition to the aforementioned two-layered layer of a lower chromium or molybdenum layer and an upper aluminum layer, there is a three-layered structure of a molybdenum layer/an aluminum layer/a molybdenum layer.

Similar to the gate lines 121 and the storage electrode line 131, the side surfaces of the data lines 171 and the drain electrodes 175a and 175b are also slanted in an angle ranging from 30° to 80°.

The ohmic contact members 163a, 163b, 165a, and 165b are interposed between the underlying semiconductors 154a and 154b and the overlying data lines 171 and drain electrodes 175a and 175b and have a function of reducing contact resistance. The island-shaped semiconductors 154a and 154b have exposed portions uncovered between the source electrodes 173a and 173b and the drain electrodes 175a and 175b, the data line 171, and the drain electrodes 175a and 175b. The semiconductors 154a and 154b have enlarged widths at the intersections to the data lines 121a and 121b to cover the boundary portions of the gate lines 121a and 121b passing through the data lines 171. Therefore, the profile of surfaces at the boundary portions is smoothed, so that the disconnection of the data lines 171 can be prevented. The semiconductors 152 are formed at the intersections of the storage electrode lines 131 and the data lines 171 to cover the boundary portions of the storage electrode lines 131 passing through the data lines 171. Therefore, the profile of surfaces at the boundary portions is smoothed, so that the disconnection of the data lines 171 can be prevented.

A protective film (passivation layer) 180 is formed on the data lines 171, the drain electrodes 175a and 175b, and the exposed portions of the semiconductors 154a and 154b. The protective film 180 is made of an inorganic material such as a silicon nitride and a silicon oxide, an organic material having an excellent planarization property and photosensitivity, and a low dielectric-constant insulating material formed with a plasma enhanced chemical vapor deposition (PECVD) such as a-Si:C:O and a-Si:O:F. However, in order to use excellent properties of an organic film and protect the exposed portions of the semiconductors 151, the protective film 180 may have a two-layered structure of a lower inorganic film and an upper organic film.

In the protective film 180, a plurality of contact holes 182, 187a, 187b which expose the end portions 179 of the data lines 171 and the enlarged portions 177a and 177b of the drain electrodes 175a and 175b are formed, and in the protective film 180 and the gate insulating film 140, a plurality of contact holes 181a and 181b which expose the end portions 129a and 129b of the gate lines 121a and 121b are formed.

On the protective film 180, a plurality of pixel electrodes 190 including a plurality of the first second sub-pixel electrodes 190a and second sub-pixel electrodes 190b, a plurality of the shielding electrodes 88, and a plurality of the contact assistant members 81a, 81b, and 82 are formed. The pixel electrodes 190, the shielding electrodes 88, and the contact assistant members 81a, 81b, and 82 are made of a transparent conductive material such as ITO and IZO or a reflective conductive material such as aluminum.

The first sub-pixel electrodes 190a and second sub-pixel electrodes 190b are physically and electrically connected through the contact holes 185a and 185b to the first and second drain electrodes 175a and 175b to receive data voltages from the first and second drain electrodes 175a and 175b.

The first sub-pixel electrodes 190a and the second sub-pixel 190b applied with the data voltages together with the common electrode 270 generate an electric field, so that alignment of the liquid crystal molecules of the liquid crystal layer 3 between the two electrodes 190 and 270 can be determined.

As described above, the first sub-pixel electrodes 190a and second sub-pixel electrode 190b and the common electrode 270 constitute the liquid crystal capacitors $C_{LCa}$ and $C_{LCb}$ to sustain the applied voltages although the thin film transistors Qa and Qb turn off. In order to increase the voltage storage capability, the storage capacitors $C_{STa}$ and $C_{STb}$ connected in parallel to the liquid crystal capacitors $C_{LCa}$ and $C_{LCb}$ are constructed by overlapping the first sub-pixel electrodes 190a and second sub-pixel electrode 190b and the drain electrodes 175a and 175b connected thereto with the first and second storage electrode 137a and 137b.

The upper right corners of the pixel electrodes 190 are cut, and the cut sides have an angle of about 45° with respect to the gate lines 121a and 121b. The cut sides are shielded by the protrusions 125 the second gate lines 121b, and the protrusions 125 serve a light shielding film for preventing light leakage occurring in a vicinity of the cut sides of the pixel electrodes 190. Therefore, when dark colors are displayed, increase in brightness can be prevented. As a result, it is possible to secure a high contrast ratio and to improve display characteristics.

A pair of the first sub-pixel electrodes 190a and the second sub-pixel electrode 190b constituting one pixel electrode 190 is engaged with each other with a gap 92 interposed therebetween, and an outer boundary has a shape of an approximate rectangle.

The first sub-pixel electrode 190a has a shape of a rotated equilateral trapezoid which has a right side close to the storage electrode 137b, a left side close to the data line 171, and upper and lower slanted sides having an angle of about 45° with respect to the gate lines 121a and 121b. The second sub-pixel electrode 190b includes a pair of trapezoid portions facing a slanted side of the first sub-pixel electrode 190a and transverse portions facing the right side of the first sub-pixel electrode 190a. The gap 92 includes upper and lower slanted portions having a substantially uniform width and an angle of about 45° with respect to the gate lines 121a and 121b and a transverse portion having a substantially uniform width.

The first sub-pixel electrode 190a has central cut portions 91 and 94, and the second sub-pixel electrode 190b has lower and upper cut portions 93a and 93b. The first sub-pixel electrodes 190a and second sub-pixel electrode 190b are divided into a plurality of small domains by the cut portions 91, 94, 93a, and 93b.

The lower and upper cut portions 93a and 93b are disposed in lower and upper half regions of the pixel electrode 190, respectively, and the central cut portions 91 and 94 are disposed between the lower cut portion 93a and the upper cut portion 93b. The gap 92 and the cut portions 91, 94, 93a, and 93b have an approximate inversion symmetry with respect to the storage electrode line 131.

The lower and upper cut portions 93a and 93b extend from portions in a vicinity of the right lower and upper sides of the second sub-pixel electrode 190b and are parallel to the lower and upper slanted portions of the gap 92.

The central cut portion 91 has a longitudinal portion which extends from the right side of the first sub-pixel electrode 190a substantially along the storage electrode line 131 and a pair of slanted portions which extend from the longitudinal portion to the left side of the first sub-pixel electrode 190a and in parallel to the lower and upper cut portions 93a and 93b.

The central cut portion 94 has a pair of slanted sides which are recessed from the left side of the first sub-pixel electrode 190a and parallel to the lower and upper cut portions 93a and 93b.

Accordingly, the lower half region of the first sub-pixel electrode 190a is divided into two regions by the central cut portion 91, and the upper half region thereof is divided into two regions by the central cut portion 91.

The lower half region of the second sub-pixel electrode 190b is divided into two regions by the lower cut portion 93a, and the upper half region thereof is divided into two regions by the central cut portion 93b.

Here, the number of domains or the number of cut portions may vary according to a size of pixel, an aspect ratio of the first sub-pixel electrodes 190a and second sub-pixel electrode 190b, a type or characteristics of the liquid crystal layer 3, or other design factors. Hereinafter, for the convenience of description, the gap 92 is also referred to as a cut portion.

In addition, the first sub-pixel electrode 190a overlaps with the first gate line 121a, and the second sub-pixel electrode 190b overlaps with both of the first and second gate lines 121a and 121b.

The shielding electrodes 88 extend along the data lines 171 and entirely cover the data lines 171. In order to apply a common voltage to the shielding electrodes 88, the shielding electrodes 88 may be connected through contact holes (not shown) of the protective film 180 and the gate insulating film 140 to the storage electrode line 131 or a short point (not shown) through which the common voltage is transmitted from the thin film transistor panel 100 to the common electrode panel 200. Here, it is preferable that a distance between the shielding electrode 88 and the pixel electrode 190 is designed to be minimized in order to minimize the decrease in the aperture ratio.

Like this, if the shielding electrodes 88 applied with the common voltage are disposed over the data lines 171, the shielding electrodes 88 shield the electric field generated between the data lines 171 and the pixel electrodes 190 and between the data lines 171 and the common electrode 270, so that voltage distortion of the pixel electrodes 190 and signal delay of data voltage transmitted by the data lines 171 can be reduced.

In addition, since the pixel electrodes 190 and the shielding electrodes 88 are separated from each other by a distance in order to prevent short-circuit therebetween, the pixel electrodes 190 can be further separated from the data lines 171, so that parasitic capacitance therebetween can be reduced. In addition, since a permittivity of the liquid crystal layer 3 is higher than that of the protective film 180, the parasitic capacitance between the data lines 171 and the shielding electrodes 88 is lower than the parasitic capacitance between the data lines 171 and common electrode 270 in a case where the shielding electrode 88 is not provided.

In addition, since the pixel electrodes 190 and the shielding electrodes 88 are constructed with the same layer, the distance therebetween can be uniformly maintained, so that the parasitic capacitance therebetween is uniform. Although the parasitic capacitance between the pixel electrodes 190 and the data lines 171 may vary according to exposed regions divided in a division exposure process, since the parasitic capacitance between the pixel electrodes 190 and the data lines 171 is relatively reduced, the overall parasitic capacitance is considered to be substantially uniform. Therefore, it is possible to minimize stitch defects.

The contact assistant members 81a, 18b, and 82 are connected through the contact holes 181a, 181b, and 182 to the end portions 129a and 129b of the gate lines 121a and 121b and the end portions 179 of the data lines 171, respectively. The contact assistant members 81a, 18b, and 82 have a function of compensating for adhesiveness of the exposed end portions 129a and 129b of the gate lines 121a and 121b and the exposed end portions 179 of the data lines 171 to external apparatuses and protecting these portions.

An alignment film 11 for aligning the liquid crystal layer 3 is coated on the pixel electrode 190, the contact assistant members 81a, 81b, and 82, and the protective film 180.

Now, the common electrode panel 200 will be described with reference to FIGS. 17 to 18.

A light-shielding member 220 for preventing light leakage, that is, called black matrix, is formed on a dielectric substrate 210 made of a transparent glass or the like. The light-shielding member 220 is constructed with portions 221 corresponding to the data lines 171 and portions 224 corresponding to the thin film transistors. Alternatively, the light-shielding member 220 may includes a plurality of opening portions which face the pixel electrodes 190 and have substantially the same shape as the pixel electrodes 190. However, the light-shielding member 220 may have various shapes in order to shield the light leakage in a vicinity of the pixel electrodes 190 and the thin film transistors Qa and Qb.

A plurality of color filters 230 are formed on the substrate 210. The color filters 230 are disposed in most regions surrounded by the light-shielding members 220 and extend along the pixel electrodes 190 in the transverse direction. The color filters 230 can display one of primary colors such as red, green, and blue.

A cover film 250 is formed on the color filters 230 and the light-shielding member 220 in order to prevent the color filters 230 from being exposed and to provide a planarized surface.

A common electrode 270 made of a transparent conductive material such as ITO and IZO is formed on the cover film 250.

The common electrode 270 includes a plurality of pairs of cut portions 71, 72, 73a, 73b, 74a, and 74b.

A group of the cut portions 71, 72, 73a, 73b, 74a, and 74b faces a pair of the first second sub-pixel electrodes 190a and second sub-pixel electrode 190b and includes a plurality of the lower and upper cut portions 73a, 74a, 73b, and 74b and the central cut portions 71 and 72. The cut portions 71, 72, 73a, 73b, 74a, and 74b are disposed between the adjacent cut portions 91, 92a, and 92b of the pixel electrode 190 or between the edge cut portions 93a and 93b and the slanted sides of the pixel electrode 190.

In addition, each of the cut portions 71, 72, 73a, 73b, 74a, and 74b includes at least one slanted portions which extends in parallel to the lower portion of the pixel electrode 190 or the lower cut portions 91, 92a, 92b, 93a, and 93b.

The cut portion 71 includes a longitudinal portion which extends along a central longitudinal line of the pixel electrode 190, a pair of slanted portions which extend from the longitudinal portion to the left side of the pixel electrode 190, and a pair of transverse portions which extend from ends of the slanted portions along the left side of the pixel electrode 190 with an obtuse angle with respect to the slanted portions and overlap with the sides of the pixel electrode 190.

The cut portion 72 includes a central transverse portion extends from a central portion of the right side of the pixel electrode 190 along a transverse portion of the gap 92 and overlaps with the right side of the first sub-pixel electrode 190a, a pair of slanted portions which extend from the both ends of the central transverse portion along the left side of the pixel electrode 190 with an obtuse angle with respect to the central transverse portions, and distal transverse portions which extend from a pair of the slanted portions along the left side of the pixel electrode 190 with an obtuse angle with respect to the slanted portions and overlap with the left side of the pixel electrode 190.

Each of the lower and upper cut portions 73a and 73b includes a slanted portion which extends from the right side of the pixel electrode 190 to the upper left corner or the lower left corner of the pixel electrode 190 and a transverse portion which extends from the ends of the slanted portion along the left or right side of the pixel electrode 190 with an obtuse angle with respect to the slanted portion and overlaps with the left or right side of the pixel electrode 190.

Each of the lower and upper cut portions 74a and 74b includes a slanted portion which extends from the right side of the pixel electrode 190 to the upper or lower side of the pixel electrode 190 and longitudinal and transverse portions which extend from the ends of the slanted portion along the side of the pixel electrode 190 with an obtuse angle with respect to the slanted portion and overlap with the side of the pixel electrode 190.

In addition, notches 77 for controlling alignment of the liquid crystal molecules with in the cut portions 71, 72, 73a, 73b, 74a, and 74b are formed in the cut portions 71, 72, 73a, 73b, 74a, and 74b of the common electrode 270.

The number of the cut portions 71, 72, 73a, 73b, 74a, and 74b may vary according to the design factors, and the light-shielding member 220 overlaps with the cut portions 71, 72, 73a, 73b, 74a, and 74b to shield the light leakage in a vicinity of the cut portions 71, 72, 73a, 73b, 74a, and 74b.

At least one of the cut portions 91 to 93b and 71 to 74b may be replaced with protrusions or recessed portions, and the shapes and arrangement of the cut portions 91 to 93b and 71 to 74b may be modified.

An alignment film 21 for aligning the liquid crystal molecules is coated on the common electrode 270.

Perpendicular polarizing plates 12 and 22 are provided on outer surfaces of the panels 100 and 200. Transmission axes of two polarizing plates 12 and 22 are perpendicular to each other, and one of the transmission axes (or absorbing axes) is in parallel to the longitudinal direction. In case of a reflective type liquid crystal display apparatus, one of the two polarizing plates 12 and 22 may be omitted.

The liquid crystal layer 3 has a negative anisotropic permittivity, and the liquid crystal molecules are aligned so as for major axes thereof to be perpendicular to the surfaces of the two panels 100 and 200 when no electric field is applied to the liquid crystal molecules.

When the common voltage and the data voltages are applied to the common electrode 270 and the pixel electrode 190, respectively, an electric field is generated in a direction substantially perpendicular to the surfaces of the panels 100 and 200. The cut portions 91 to 93b and 71 to 74b of the electrodes 190 and 270 distort the electric field to generate a horizontal component which is perpendicular to the sides of the cut portions 91 to 93b and 71 to 74b. Accordingly, the electric field is oriented in a direction slanted with a direction perpendicular to the surfaces of the panels 100 and 200. In response to the electric field, the liquid crystal molecules have a tendency to change the major axis direction to be perpendicular to the direction of the electric field. At this time, since the electric field in a vicinity of the cut portions 91 to 93b and 71 to 74b and the sides of the pixel electrode 190 has a predetermined angle which is not in parallel to the major axes direction of the liquid crystal molecules, the liquid crystal molecules rotates in such a direction that the moving distance on the surface formed by the major axis direction of the liquid crystal molecules and the electric field is short. Therefore, one group of the cut portions 91 to 93b and 71 to 74b and the sides of the pixel electrode 190 divide the region of the liquid crystal layer 3 located on the pixel electrode 190 into a plurality of domains where the liquid crystal molecules have different tilted angles, so that it is possible to increase a reference viewing angle.

A difference between the data voltage applied to the sub-pixels PXa and PXb and the common voltage $V_{com}$ becomes a charge voltage of the liquid crystal capacitors $C_{LCa}$ and $C_{LCa}$, that is, a pixel voltage. Alignment of the liquid crystal molecules varies according to the intensity of the pixel voltage. Therefore, polarization of light passing through the liquid crystal layer 3 changes. The change in the polarization results in a change in transmittance of the light due to the polarizer attached to the display panels 100 and 200.

In the liquid crystal display apparatus, the gamma curves Ta and Tb of the sub-pixels PXa and PXb which represent change in transmittance with respect to the input grayscales GS1 to GSF are different from each other. Namely, the pixel voltage applied to the first sub-pixel PXa has a gamma curve Ta, and the pixel voltage applied to the second sub-pixel PXb has a gamma curve Tb, so that the gamma curve of the one PX is a composite curve T of the gamma curves. In the determination of the pixel voltages of the sub-pixels PXa and PXb, the composite gamma curve T is determined to be close to the reference gamma curve for the front surface. For example, the composite gamma curve T for the front surface is determined to be equal to the reference gamma curve for the front surface which is most suitable, and the composite gamma curve T for the side surface is determined to be closest to the reference gamma curve for the front surface. For example, if the gamma curve located at the lower side is formed to be further low in a low grayscale, it is possible to further improve side visibility.

Like this, since the two sub-pixels PXa and PXb are individually controlled based on the independent gamma curves by using the separate thin film transistors Qa and Qb, the voltages of the two sub-pixels PXa and PXb can be accurately adjusted to desired levels, so that brightness for grayscales in the sub-pixels PXa and PXb can be maintained in the highest values. Accordingly, it is possible to improve visibility, increase an aperture ratio, and improve transmittance.

In the liquid crystal display apparatus, the area ratio between the first sub-pixel electrodes 190a and second sub-pixel electrode 190b of the first and second pixels PXa and PXb is determined, and then, the first and second sub-pixels PXa and PXb are designed based on the capacitance ratio between the first and second liquid crystal capacitors $C_{LCa}$ and $C_{LCb}$ obtained from the area ratio.

Namely, the capacitance ratio between the first and second storage capacitors $C_{STa}$ and $C_{STb}$ and capacitance ratio between the first and second parasitic capacitors $C_{GDa}$ and $C_{GDb}$ formed between the gate electrodes and the drain electrodes of the first and second thin film transistors Qa and Qb are determined to be equal to the capacitance ratio between the first and second liquid crystal capacitors $C_{LCa}$ and $C_{LCb}$.

Assuming that the areas of the gate electrodes of the first and second thin film transistors Qa and Qb are constant and channel lengths thereof are fixed to a minimum line width, as the channel widths W increase, the areas of the drain electrodes overlapping the gate electrodes increase. As the channel widths W decrease, the areas of the drain electrodes overlapping the gate electrodes decrease. Therefore, the capacitances of the first and second parasitic capacitors $C_{GDa}$ and $C_{GDb}$ can be determined by adjusting the channel widths W of the thin film transistors Qa and Qb.

Alternatively, both of the channel width W and channel length L of the thin film transistors Qa and Qb may be adjusted. Otherwise, the sizes of the thin film transistors may be determined by adjusting only the channel length L.

The pixel voltages of the first and second sub-pixels PXa and PXb are influenced by a kickback voltage Vk of which magnitude is determined by using Equation 1 according to capacitances of the liquid crystal capacitors $C_{Lca}$ and $C_{LCa}$, the storage capacitors $C_{STa}$ and $C_{STb}$, and the parasitic capacitors $C_{GDa}$ and $C_{GDb}$.

$$Vk = \frac{xVgsC_{GD}}{C_{ST} + C_{Cl} + C_{GD}} \quad \text{[Equation 1]}$$

Here, $C_{LC}$ denotes capacitance of a liquid crystal capacitor, $C_{ST}$ denotes capacitance of a storage capacitor, $C_{GS}$ denotes parasitic capacitance of a parasitic capacitor generated between a data line electrode and a drain electrode of a thin film transistor, and $\Delta Vg$ denotes changing width of a gate signal.

If the capacitance ratios between the first and second storage capacitors $C_{STa}$ and $C_{STb}$ and the first and second parasitic capacitors $C_{GDa}$ and $C_{GDb}$ are allowed to be equal to the capacitance ratio between the first and second liquid crystal capacitors $C_{LCa}$ and $C_{LCb}$, the magnitudes of the kickback voltages can be equal to each other. Moreover, the capacitance ratio between the electrostatic capacitances $C_{LCa}+C_{STa}$ and $C_{LCb}+C_{STb}$ the first and second sub-pixels PXa and PXb is also equal to the capacitance ratio of the liquid crystal capacitors $C_{LCa}$ and $C_{LCb}$.

In the pixel of FIG. 18, the pixel where the first sub-pixel electrodes 190a and second sub-pixel electrode 190b serve as main and sub-pixels, respectively, is denoted by pixel D, and the pixel where the first sub-pixel electrodes 190a and second sub-pixel electrode 190b serve as sub and main pixels, respectively, is denoted by pixel E. In this case, in the pixel array of FIG. 21, the pixel D and the pixel E are repeatedly arrayed.

In this case, the main pixels 190a of the pixels D and the main pixels 190b of the pixels E are arrayed at the left and right sides of the data lines 171, and the sub-pixels 190b of the pixels D and the sub-pixels 190a of the pixels E are arrayed at the left and right sides of the data lines 171. Accordingly, since the adjacent pixels are the pixels applied with the same voltage, the difference between the left and right brightness dose not occur, so that the difference between the left and right visibilities does not occur.

In addition, as shown in FIG. 22, the main pixels 190a of the pixels D are arrayed so as not to be adjacent to the same pixels A in the up, down, left, and right directions, so that the sub-pixels are not serially connected to each other in the up and down directions. In addition, the main and sub-pixels are alternately arrayed in the up and down direction, so that the overall mixed array can be obtained. As a result, such a strip pattern in the up and down directions can be prevented, so that the problem of the left-right and up-down asymmetry visibility caused by the side light leakage and texture can be solved.

In a thin film transistor panel according to the present invention, an image is displayed with two gamma curves on one pixel, so that it is possible to improve side visibility.

In particular, a thin film transistor panel according to the present invention includes pixels where sub-pixel electrodes directly applied with image signals and sub-pixel electrodes applied with dropped image voltages are arrayed in a left and right symmetrical structure, it is possible to secure uniform side visibility.

In addition, main pixels of pixels are arrayed in left and right sides of data lines, and sub-pixels of pixels arrayed in the left and right sides of the data lines, so that the same voltage can be applied to the adjacent pixels. As a result, a difference between left and right brightness does not occur, so that a difference between left and right visibilities does not occur.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A thin film transistor panel comprising:
a substrate;
gate lines formed on the substrate;
data lines insulated from the gate lines and intersecting the gate lines;

a plurality of thin film transistors connected to the gate lines and the data lines, the thin film transistors each having a drain electrode;

a plurality of capacitive coupling electrodes each capacitive coupling electrode being associated with and connected to the drain electrode of the associated thin film transistor; and a plurality of pixel electrodes arranged in a matrix each of the pixel electrodes comprising a first sub-pixel electrode and a second sub-pixel electrode, and each of the pixel electrodes being associated with a pixel area defined by the gate lines and the data lines, wherein the first and second sub-pixel electrodes of each pixel are connected to the drain electrode of the associated thin film transistor, and the second sub-pixel electrode is spaced apart from the first sub-pixel electrode and further wherein the first and second sub-pixel electrodes overlap the capacitive coupling electrodes, wherein the second sub-pixel electrodes have a truncated triangular shape and the truncated shorter end in ones of the second sub-pixel electrodes face in a different direction than the truncated shorter ends of other of the second sub-pixel electrodes.

2. The thin film transistor panel of claim 1, wherein the second sub-pixel electrodes in a row of pixels face in a common direction, and the direction and second sub-pixel electrodes in a column direction face in an alternately direction.

3. The thin film transistor panel of claim 1, wherein the second sub-pixel electrodes in a row of pixels face in a common direction, and the second sub-pixel electrodes in a column direction face in an alternately direction in units of two columns.

4. The thin film transistor panel of claim 1, wherein adjacent second sub-pixel electrodes of different pixel electrodes which are symmetrically positioned are arrayed in the same area or number.

5. The thin film transistor panel of claim 1, wherein the pixel electrode has cut portions as domain division means.

6. The thin film transistor panel of claim 5, wherein the cut portions are connected to each other to form gaps which separate the first pixel electrodes and the second pixel electrodes.

7. The thin film transistor panel of claim 6, wherein the gaps have slanted portions having a slanted angle of 45° with respect to the first signal lines.

8. A thin film transistor panel comprising:
a substrate;
gate lines formed on the substrate;
data lines insulated from the gate lines and intersecting the gate lines;
a plurality of thin film transistors connected to the gate lines and the data lines, the thin film transistors each having a drain electrode;
a plurality of capacitive coupling electrodes each capacitive coupling electrode being associated with and connected to the drain electrode of the associated thin film transistor; and
a plurality of pixel electrodes arranged in a matrix each of the pixel electrodes comprising a first sub-pixel electrode and a second sub-pixel electrode, and each of the pixel electrodes being associated with a pixel area defined by the gate lines and the data lines, wherein the first and second sub-pixel electrodes of each pixel are connected to the drain electrode of the associated thin film transistor, and the second sub-pixel electrode is spaced apart from the first sub-pixel electrode and further wherein the first and second sub-pixel electrodes overlap the capacitive coupling electrodes, wherein the second sub-pixel electrodes have a truncated triangular shape and the truncated shorter end in ones of the second sub-pixel electrodes face in a different direction than the truncated shorter ends of other of the second sub-pixel electrodes.

9. The thin film transistor panel of claim 8, wherein positions of the first pixel electrodes connected to the drain electrodes in the different pixels are different from each other.

10. The thin film transistor panel of claim 8, wherein the first pixel electrode of one of the pixels is adjacent to the second pixel electrode of different pixels which are adjacent to each other in an up down direction.

11. The thin film transistor panel of claim 8, wherein the pixel electrode has cut portions as domain division means.

12. The thin film transistor panel of claim 8, wherein the cut portions are connected to each other to form gaps which separate the first pixel electrodes and the second pixel electrodes.

13. The thin film transistor panel of claim 8, wherein the gaps have slanted portions having a slanted angle of 45° with respect to the first signal lines.

14. A thin film transistor panel comprising:
gate lines adapted to transmit scan signals;
data lines intersecting the gate lines, the data lines being adapted to transmit image signals;
thin film transistors connected to the gate lines and the data lines, the thin film transistors each having a drain electrode; and
pixel electrodes connected to the drain of electrodes of the thin film transistors formed in pixels surrounded by the gate lines and the data lines,
wherein the pixel electrodes include first and second sub-pixel electrodes,
wherein the gate lines include first and second gate lines disposed to correspond to the first and second sub-pixel electrodes,
wherein the thin film transistors include first and second thin film transistors connecting the first and second sub-pixel electrode, the first and second gate lines, and the data lines,
wherein the drain electrodes include the first and second drain electrodes, and
wherein the first sub-pixel electrodes of different pixels are adjacent to each other, and the second sub-pixel electrodes of the different pixels are adjacent to each other.

15. The thin film transistor panel of claim 14, wherein the first sub-pixel electrodes of the different pixels have different positions.

16. The thin film transistor panel of claim 14, wherein the first sub-pixel electrode of one pixel is adjacent to the second sub-pixel electrode of different pixels adjacent to the one pixel in an up down direction.

17. The thin film transistor panel of claim 14, further comprising storage electrode lines inducing first and second storage electrodes which overlap with the first and second sub-pixel electrodes, respectively.

18. The thin film transistor panel of claim 14, wherein the first and second sub-pixel electrodes have a substantially symmetrical shape with respect to a straight line parallel to the gate line.

19. The thin film transistor panel of claim 18, wherein at least one of the first and second sub-pixel electrodes has cut portions.

20. The thin film transistor panel of claim 19, wherein the common electrode has cut portions.

21. The thin film transistor panel of claim 20, wherein at least one of the first and second pixel electrodes and the common electrode have cut portions which are alternately arrayed.

22. The thin film transistor panel of claim 14, further comprising shielding electrodes which overlap with the data lines and are disposed on the same layer as the first and second sub-pixel electrodes are disposed on.

* * * * *